(12) United States Patent
Sloan et al.

(10) Patent No.: US 8,199,010 B2
(45) Date of Patent: Jun. 12, 2012

(54) METHOD AND APPARATUS FOR CONFIGURING A WIRELESS SENSOR

(75) Inventors: Greg Edward Sloan, Allentown, PA (US); Andrew Peter Schmalz, Macungie, PA (US); Jon M. Keagy, Perkasie, PA (US); Jason C. Killo, Emmaus, PA (US); Joel S. Spira, Coopersburg, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 634 days.

(21) Appl. No.: 12/371,027

(22) Filed: Feb. 13, 2009

(65) Prior Publication Data

US 2010/0207759 A1    Aug. 19, 2010

(51) Int. Cl.
*G08B 13/00* (2006.01)

(52) U.S. Cl. ............ 340/541; 340/552; 340/540
(58) Field of Classification Search ......... 340/552
See application file for complete search history.

(56) References Cited

U.S. PATENT DOCUMENTS

| | | |
|---|---|---|
| 4,019,180 A | 4/1977 | Graves |
| 4,412,211 A * | 10/1983 | Lautzenheiser et al. ...... 340/514 |
| 4,413,660 A * | 11/1983 | Conrad ............. 140/119 |
| 4,461,977 A | 7/1984 | Pierpoint |
| 4,527,099 A | 7/1985 | Capewell et al. |
| 4,727,587 A * | 2/1988 | Black ............. 381/395 |
| 5,189,393 A | 2/1993 | Hu |
| 5,216,333 A | 6/1993 | Nuckolls |
| 5,386,210 A | 1/1995 | Lee |
| 5,390,206 A | 2/1995 | Rein et al. |
| 5,406,173 A | 4/1995 | Mix |
| 5,455,487 A | 10/1995 | Mix |

(Continued)

FOREIGN PATENT DOCUMENTS

EP    0571052 A1    11/1993

(Continued)

OTHER PUBLICATIONS

European Patent Office, International Search Report and Written Opinion for International Patent Application No. PCT/US2010/023347, Jun. 14, 2010, 19 pages.

(Continued)

*Primary Examiner* — George Bugg
*Assistant Examiner* — Kerri McNally
(74) *Attorney, Agent, or Firm* — Mark E. Rose; Philip N. Smith; Bridget L. McDonough

(57) ABSTRACT

A wireless sensor for a load control system is adapted to be releasably mounted to a surface, such as a drop ceiling panel, to allow the optimum location of the sensor to be determined. A releasable mounting means of the sensor comprises two posts extending perpendicularly from a rear surface of the sensor. Each post has a small diameter and is rigid enough to pierce the panel without creating a large aesthetically-displeasing hole. The sensor may be permanently affixed to the panel by bending the posts at a rear surface of the panel without the use of a tool, such that the panel is captured between the mounting plate and the deformed posts. The sensor further comprises multiple test buttons provided on an outwardly-facing surface of the sensor for separately testing the communications of the load control system and the operation of the sensor. Alternatively, the releasable mounting means may comprise one or more magnets for magnetically coupling the sensor to a grid structure of the ceiling.

56 Claims, 12 Drawing Sheets

U.S. PATENT DOCUMENTS

| | | | |
|---|---|---|---|
| 5,489,827 | A | 2/1996 | Xia |
| 5,598,042 | A | 1/1997 | Mix |
| 5,623,172 | A | 4/1997 | Zaretsky |
| 5,637,964 | A | 6/1997 | Hakkarainen |
| 5,640,143 | A | 6/1997 | Myron et al. |
| 5,699,243 | A | 12/1997 | Eckel |
| 5,726,900 | A | 3/1998 | Walter |
| 5,739,753 | A | 4/1998 | Porter |
| 5,764,146 | A | 6/1998 | Baldwin |
| 5,772,326 | A | 6/1998 | Batko |
| 5,774,322 | A | 6/1998 | Walter |
| 5,786,644 | A | 7/1998 | Zaretsky |
| 5,790,040 | A | 8/1998 | Kreier et al. |
| 5,821,642 | A | 10/1998 | Nishhira |
| 5,838,226 | A | 11/1998 | Houggy |
| 5,848,054 | A | 12/1998 | Mosebrook |
| 5,898,733 | A | 4/1999 | Satyanarayana |
| 5,905,442 | A | 5/1999 | Mosebrook |
| 5,927,844 | A | 7/1999 | Justiniano |
| 5,946,209 | A | 8/1999 | Eckel |
| 5,971,597 | A | 10/1999 | Baldwin |
| 5,973,594 | A | 10/1999 | Baldwin |
| 5,984,513 | A | 11/1999 | Baldwin |
| 6,082,894 | A | 7/2000 | Batko |
| 6,114,816 | A | 9/2000 | Nuckolls |
| 6,126,296 | A | 10/2000 | Justiniano |
| 6,138,241 | A | 10/2000 | Eckel |
| 6,151,529 | A | 11/2000 | Batko |
| 6,166,640 | A | 12/2000 | Nishihira |
| 6,225,760 | B1 | 5/2001 | Moan |
| 6,275,163 | B1 | 8/2001 | Bogorad |
| 6,285,912 | B1 | 9/2001 | Ellison |
| 6,289,404 | B1 | 9/2001 | Bonasia |
| 6,307,331 | B1 | 10/2001 | Bonasia |
| 6,307,354 | B1 | 10/2001 | Nishihira |
| 6,324,008 | B1 | 11/2001 | Baldwin |
| 6,340,864 | B1 | 1/2002 | Wacyk |
| 6,348,686 | B1 | 2/2002 | Howard |
| 6,385,732 | B1 | 5/2002 | Eckel |
| 6,388,399 | B1 | 5/2002 | Eckel et al. |
| 8,388,399 | | 5/2002 | Eckel |
| 6,404,079 | B1 | 6/2002 | Hsieh |
| 6,427,019 | B1 * | 7/2002 | Ketterer et al. ............ 381/386 |
| 6,466,826 | B1 | 10/2002 | Nishihira |
| 6,472,853 | B2 | 10/2002 | Nishihira |
| 6,479,823 | B1 | 11/2002 | Strang |
| 6,617,560 | B2 | 9/2003 | Forke |
| 6,697,757 | B2 | 2/2004 | Eckel |
| 6,729,547 | B1 | 5/2004 | Charlier et al. |
| 6,759,954 | B1 | 7/2004 | Myron |
| 6,791,458 | B2 | 9/2004 | Baldwin |
| 6,798,341 | B1 | 9/2004 | Eckel |
| 6,803,728 | B2 | 10/2004 | Balasubramaniam |
| 6,807,463 | B1 | 10/2004 | Cunningham et al. |
| 6,832,072 | B2 | 12/2004 | Buckingham et al. |
| 6,856,236 | B2 | 2/2005 | Christensen et al. |
| 6,859,644 | B2 | 2/2005 | Wang |
| 6,885,300 | B1 | 4/2005 | Johnston |
| 6,888,323 | B1 | 5/2005 | Null |
| 6,909,668 | B2 | 6/2005 | Baldwin |
| 6,930,260 | B2 | 8/2005 | Clegg |
| 6,933,486 | B2 | 8/2005 | Pitigoi-Aron |
| 6,940,230 | B2 | 9/2005 | Myron |
| 6,952,165 | B2 | 10/2005 | Kovach et al. |
| 7,006,792 | B2 | 2/2006 | Wilson |
| 7,027,355 | B2 | 4/2006 | Baldwin |
| 7,027,770 | B2 | 4/2006 | Judd |
| 7,092,772 | B2 | 8/2006 | Murray |
| 7,102,502 | B2 | 9/2006 | Autret |
| 7,106,261 | B2 | 9/2006 | Nagel |
| 7,116,056 | B2 | 10/2006 | Jacoby |
| 7,122,976 | B1 | 10/2006 | Null |
| 7,123,139 | B2 | 10/2006 | Sweeny |
| 7,126,291 | B2 | 10/2006 | Kruse |
| 7,164,110 | B2 | 1/2007 | Pitigoi-Aron |
| 7,190,126 | B1 | 3/2007 | Paton |
| 7,208,887 | B2 | 4/2007 | Mosebrook |
| 7,211,798 | B2 * | 5/2007 | Wu et al. ............ 250/342 |
| 7,219,141 | B2 | 5/2007 | Bonasia et al. |
| 7,230,532 | B2 | 6/2007 | Albsmeier et al. |
| 7,239,898 | B2 | 7/2007 | Lenchik et al. |
| 7,268,682 | B2 | 9/2007 | Bialecki et al. |
| 7,274,117 | B1 | 9/2007 | Viola |
| 7,277,012 | B2 | 10/2007 | Johnston |
| 7,295,115 | B2 | 11/2007 | Aljadeff et al. |
| 7,307,542 | B1 | 12/2007 | Chandler |
| 7,356,429 | B2 | 4/2008 | Eskildsen |
| 7,358,927 | B2 | 4/2008 | Luebke |
| 7,361,853 | B2 | 4/2008 | Clegg |
| 7,362,285 | B2 | 4/2008 | Webb |
| 7,369,060 | B2 | 5/2008 | Veskovic |
| 7,391,297 | B2 | 6/2008 | Cash |
| 7,394,451 | B1 | 7/2008 | Patten |
| 7,400,594 | B2 | 7/2008 | Pereira et al. |
| 7,400,911 | B2 | 7/2008 | Planning et al. |
| 7,405,524 | B2 | 7/2008 | Null |
| 7,408,525 | B2 | 8/2008 | Webb |
| 7,411,489 | B1 | 8/2008 | Elwell et al. |
| 7,414,210 | B2 | 8/2008 | Clegg |
| 7,421,247 | B2 | 9/2008 | Buckingham et al. |
| 7,432,460 | B2 | 10/2008 | Clegg |
| 7,432,463 | B2 | 10/2008 | Clegg |
| 7,432,690 | B2 | 10/2008 | Williams |
| 7,436,132 | B1 | 10/2008 | Null |
| 7,440,246 | B2 | 10/2008 | Bonasia |
| 7,480,208 | B2 | 1/2009 | Bender |
| 7,480,534 | B2 | 1/2009 | Bray |
| 7,486,193 | B2 | 2/2009 | Elwell |
| 7,538,285 | B2 | 5/2009 | Patel |
| 7,541,924 | B2 | 6/2009 | Elwell |
| 7,548,216 | B2 | 6/2009 | Webb |
| 7,560,696 | B2 | 7/2009 | Wu |
| 7,566,137 | B2 | 7/2009 | Veskovic |
| 7,573,208 | B2 | 8/2009 | Newman |
| 7,573,436 | B2 | 8/2009 | Webb |
| 7,588,067 | B2 | 9/2009 | Veskovic |
| 7,592,967 | B2 | 9/2009 | Mosebrook |
| 7,623,042 | B2 | 11/2009 | Huizenga |
| 7,626,339 | B2 | 12/2009 | Paton |
| 7,640,351 | B2 | 12/2009 | Reckamp |
| 7,670,039 | B2 | 3/2010 | Altonen |
| 7,694,005 | B2 | 4/2010 | Reckamp |
| 7,698,448 | B2 | 4/2010 | Reckamp |
| 7,723,939 | B2 | 5/2010 | Carmen |
| 7,741,782 | B2 | 6/2010 | Vermeulen |
| 7,755,505 | B2 | 7/2010 | Johnson |
| 7,755,506 | B1 | 7/2010 | Clegg |
| 7,756,556 | B2 | 7/2010 | Patel |
| 7,768,422 | B2 | 8/2010 | Carmen |
| 7,778,262 | B2 | 8/2010 | Beagley |
| 7,787,485 | B2 | 8/2010 | Howe |
| 7,791,282 | B2 | 9/2010 | Yu |
| 7,800,049 | B2 | 9/2010 | Bandringa |
| 7,800,319 | B2 | 9/2010 | Raneri |
| 7,800,498 | B2 | 9/2010 | Leonard |
| 7,837,344 | B2 | 11/2010 | Altonen |
| 7,870,232 | B2 | 1/2011 | Reckamp |
| 7,872,423 | B2 | 1/2011 | Biery |
| 7,880,639 | B2 | 2/2011 | Courtney |
| 7,886,338 | B2 | 2/2011 | Smith |
| 7,943,876 | B2 | 5/2011 | Kim |
| 2001/0040805 | A1 | 11/2001 | Lansing |
| 2002/0043938 | A1 | 4/2002 | Lys |
| 2003/0040813 | A1 | 2/2003 | Gonzales et al. |
| 2003/0109270 | A1 | 6/2003 | Shorty |
| 2004/0052076 | A1 | 3/2004 | Mueller et al. |
| 2004/0119415 | A1 | 6/2004 | Lansing et al. |
| 2006/0028997 | A1 | 2/2006 | McFarland |
| 2006/0037380 | A1 | 2/2006 | Bulst et al. |
| 2006/0044152 | A1 | 3/2006 | Wang |
| 2006/0174102 | A1 | 8/2006 | Smith et al. |
| 2006/0215345 | A1 | 9/2006 | Huizenga |
| 2006/0245360 | A1 | 11/2006 | Ensor et al. |
| 2006/0281435 | A1 | 12/2006 | Shearer et al. |
| 2007/0045431 | A1 | 3/2007 | Chapman, Jr. et al. |
| 2007/0162536 | A1 | 7/2007 | Ostrovsky et al. |
| 2007/0182580 | A1 | 8/2007 | Elwell |

| | | |
|---|---|---|
| 2007/0183329 A1 | 8/2007 | Elwell |
| 2007/0216313 A1 | 9/2007 | Soccoli et al. |
| 2007/0222584 A1 | 9/2007 | Albsmeier et al. |
| 2007/0230144 A1 | 10/2007 | Engel |
| 2007/0242688 A1 | 10/2007 | McFarland |
| 2007/0272293 A1 | 11/2007 | Schmidt |
| 2007/0281520 A1 | 12/2007 | Insalaco et al. |
| 2008/0068126 A1 | 3/2008 | Johnson et al. |
| 2008/0074059 A1 | 3/2008 | Ahmed |
| 2008/0083834 A1 | 4/2008 | Krebs et al. |
| 2008/0088181 A1 | 4/2008 | Cash |
| 2008/0088435 A1 | 4/2008 | Cash |
| 2008/0111491 A1 | 5/2008 | Spira |
| 2008/0136663 A1 | 6/2008 | Courtney et al. |
| 2008/0218099 A1 | 9/2008 | Newman |
| 2008/0224835 A1 | 9/2008 | Noest |
| 2008/0258633 A1 | 10/2008 | Voysey |
| 2008/0265782 A1 | 10/2008 | Crouse et al. |
| 2008/0266050 A1 | 10/2008 | Crouse et al. |
| 2008/0273754 A1 | 11/2008 | Hick |
| 2009/0174552 A1 | 7/2009 | Soccoli |
| 2010/0052574 A1 | 3/2010 | Blakeley et al. |
| 2010/0052576 A1 | 3/2010 | Steiner et al. |
| 2010/0052894 A1 | 3/2010 | Steiner et al. |

FOREIGN PATENT DOCUMENTS

| | | |
|---|---|---|
| EP | 1282092 A2 | 2/2003 |
| JP | 01014534 A | 1/1989 |

OTHER PUBLICATIONS

InHome Wireless Motion Sensor Installation Guide, installation guide, 2007, Card Access, Inc.

* cited by examiner

METHOD AND APPARATUS FOR CONFIGURING A WIRELESS SENSOR

BACKGROUND OF THE INVENTION

1. Field of the Invention

The present invention relates to occupancy and vacancy sensors for detecting an occupancy or a vacancy condition in a space, and more particularly, to a wireless load control system including a plurality of battery-powered occupancy or vacancy sensors having releasable mounting means for allowing the sensors to be easily fixed in a position and then released from that position during configuration of the load control system, such that the optimum locations of the sensors may be determined.

2. Description of the Related Art

Occupancy and vacancy sensors are often used to detect occupancy and/or vacancy conditions in a space in order to control an electrical load, such as, for example, a lighting load. An occupancy sensor typically operates to turn on the lighting load when the occupancy sensor detects the presence of a user in the space (i.e., an occupancy event) and then to turn off the lighting load when the occupancy sensor detects that the user has left the space (i.e., a vacancy event). A vacancy sensor only operates to turn off the lighting load when the vacancy sensor detects a vacancy in the space. Therefore, when using a vacancy sensor, the lighting load must be turned on manually (e.g., in response to a manual actuation of a control actuator).

Occupancy and vacancy sensors have often been provided in wall-mounted load control devices that are coupled between an alternating-current (AC) power source and an electrical load for control of the amount of power delivered to the electrical load. Such a wall-mounted load control device typically comprises an internal detector, such as, for example, a pyroelectric infrared (PIR) detector operable to detect infrared energy representative of the presence of an occupant in the space, and a lens for directing the infrared energy to the PIR detector. However, since the wall-mounted load control device is mounted to a wall in a standard electrical wallbox (i.e., as a replacement for a standard light switch), the detection of energy by the PIR detector may be hindered due to the direction that the load control device is facing and by obstacles in the space, thus increasing the likelihood that the load control device may not detect the presence of a user.

Alternatively, some prior art occupancy and vacancy sensors have been provided as part of lighting control systems. These sensors are typically coupled via a wired control link to a lighting controller (e.g., a central processor), which then controls the lighting loads accordingly. Since the control link is typically a low-voltage control link, these occupancy and vacancy sensors are not required to be mounted in electrical wallboxes, but may be mounted to the ceiling or high on a wall. Therefore, the occupancy and vacancy sensors may be positioned optimally to detect the presence of the user in all areas of the space. Thus, since the locations of the sensors determine the quality of the system operation, it is desirable that the occupancy and vacancy sensors may be easily fixed in a position and then released from that position during configuration of the lighting control system, such that the optimum locations of the occupancy sensors may be determined.

SUMMARY OF THE INVENTION

According to an embodiment of the present invention, a control device for a load control system is adapted to be releasably mounted to a ceiling panel that has a substantially-flat front surface and an opposite rear surface. The control device comprises a mounting plate having a rear surface adapted to be mounted adjacent to the front surface of the panel, and two posts that extend from the rear surface of the mounting plate in a direction substantially perpendicular to the rear surface of the mounting plate. Each post has a small diameter and is rigid enough to pierce the panel without creating a large aesthetically-displeasing hole in the front surface of the panel. The control device may be temporarily affixed to the panel by inserting the posts through the front surface and the rear surface of the panel, such that the posts extend from the rear surface of the panel. The control device may be permanently affixed to the panel by bending the posts at the rear surface of the panel without the use of a tool, such that the panel is captured between the mounting plate and the deformed posts.

In addition, a method of attaching a control device to a ceiling panel having a substantially-flat front surface and a rear surface is also disclosed herein. The method comprises the steps of: (1) providing two posts extending from a rear surface of the control device in a direction substantially perpendicular to the rear surface of the control device; (2) piercing the front surface of the panel with the posts, such that the posts do not create large aesthetically-displeasing holes in the front surface of the panel; (3) temporarily attaching the control device to the front surface of the ceiling panel by inserting the posts through the front surface and the rear surface of the panel, such that the posts extend from the rear surface of the panel; and (4) permanently attaching the control device to the front surface of the ceiling panel by deforming the posts at the rear surface of the panel without the use of a tool, such that the panel is captured between the rear surface of the control device and the deformed posts.

Further, an electronics assembly described herein comprises an electronics housing, an adapter plate releasably coupled to the electronics housing, and a single bendable wire received by the adapter plate. The bendable wire is adapted to be manually bent to hold its bent shape under the pressure created by the weight of the electronics housing. The bendable wire comprises a central base section disposed against an interior surface of the adapter plate and first and second parallel legs extending from opposite ends of the central base section and bent perpendicular to the plane of the interior surface of the adapter plate and extending through the adapter plate. The legs are shaped to be able to penetrate the thickness of a support panel without bending and being manually bendable behind the panel in order to bind the adapter plate flat against the panel.

A process of affixing an electronic device to a ceiling panel is also described herein. The process comprises the steps of: (1) inserting parallel, spaced legs of a single wire through openings in a flat adapter plate until a base portion of the wire is pressed flat against one surface of the adapter plate; (2) forcing the spaced legs of the wire through respective spaced points on a first surface of the ceiling panel; (3) manually bending the legs against a second surface opposite the first surface of the ceiling panel to press and hold the adapter plate against the first surface of the ceiling panel; and (4) removably connecting the electronic device to the adapter plate.

According to another embodiment of the present invention, a mounting structure for mounting an electrical device to a penetrable thin flat support sheet structure having a front and a rear surface comprises a pliant member having a central base portion and first and second parallel legs extending from opposite ends of the central base portion. The electrical device comprises a main housing containing electrical circuitry and a planar mounting plate removably connectable to the main housing. The central base portion of the pliant member is positioned adjacent to and against a rear surface of the mounting plate with the legs extending through the mounting plate and away from the main housing. The first and second legs having ends that are shaped to enable non-destructive penetration of the flat support sheet at spaced locations without distortion of the legs. The legs are manually deformable behind the rear surface of the thin flat sheet structure after penetration of the thin flat sheet structure to attach the mounting plate to the front surface of the thin flat sheet structure.

According to another aspect of the present invention, an occupancy sensor for detecting the presence or absence of an occupant in a space is adapted to be mounted to a surface, and comprises a first communication test button and a sensor test button, which are both accessible by the occupant when the occupancy sensor is mounted to the surface and are used for separately testing the communications and the operation of the occupancy sensor. The occupancy sensor is used in a lighting control system for control of the amount of power delivered to an electrical load in response to detecting the presence or absence of the occupant in the space. The occupancy sensor further comprises an occupancy detector circuit for detecting the presence or absence of the occupant in the space, a controller responsive to the occupancy detector circuit, and a wireless transmitter coupled to the controller. The controller is operable to change to an occupied state in response to the occupancy detector circuit detecting the presence of the occupant in the space, and to a vacant state at the end of a timeout period after the occupancy detector circuit detecting the absence of the occupant in the space, where the timeout period has a first value in a normal mode of operation of the sensor. The wireless transmitter transmits digital messages when the controller changes between the occupied and vacant states. In response to an actuation of the first communication test button, the controller transmits a first digital message. In response to an actuation of the sensor test button, the controller operates in a test mode, in which the timeout period has a second value that is less than the first value used in the normal mode of operation of the sensor.

According to another embodiment of the present invention, a load control system for controlling the amount of power delivered from an AC power source to an electrical load in response to the presence or absence of an occupant in a space comprises a load control device and an occupancy sensor having both a first communication button and a sensor test button. The load control device is adapted to be coupled in series electrical connection between the AC power source and the electrical load for control of the amount of power delivered to the electrical load. The load control device is operable to receive wireless control signals and to control the amount of power delivered to the electrical load in response to the wireless control signals. The occupancy sensor is operable to detect the presence or absence of the occupant in the space, such that the occupancy sensor changes to an occupied state in response to detecting the presence of the occupant in the space in response to the occupancy detector circuit, and to a vacant state at the end of a timeout period after detecting the absence of the occupant in the space. The timeout period has a first value in a normal mode of operation of the sensor. The occupancy sensor is operable to transmit wireless digital messages when the occupancy sensor changes between the occupied and vacant states. The occupancy sensor transmits a first digital message to the load control device in response to an actuation of the first communication test button, such that the load control device controls the amount of power to the electrical load in response to receiving the first digital message. The occupancy sensor operates in a test mode in response to an actuation of the sensor test button, the timeout period having a second value less than the first value in the normal mode of operation of the sensor.

In addition, a method of commissioning a load control system comprising a load control device for control of the amount of power delivered from an AC power source to an electrical load and an occupancy sensor for detecting the presence or absence of an occupant in a space is described herein. The occupancy sensor is operable to detect the presence or absence of the occupant in the space, such that the occupancy sensor changes to an occupied state in response to detecting the presence of the occupant in the space, and to a vacant state at the end of a timeout period after detecting the absence of the occupant in the space. The timeout period has a first value in a normal mode of operation of the sensor. The method comprises the steps of: (1) releasably mounting the occupancy sensor to a first position on a surface; (2) actuating a first communication test button on the occupancy sensor without detaching the occupancy sensor from the surface; (3) transmitting a first digital message from the occupancy sensor to the load control device in response to the step of actuating a first communication test button; (4) adjusting the amount of power delivered to the electrical load in response to the load control device receiving the first digital message; (5) actuating a sensor test button on the occupancy sensor without detaching the occupancy sensor from the surface; (6) operating the occupancy sensor in a test mode in response to the step of actuating a sensor test button, the timeout period having a second value in the test mode, where the second value is less than the first value used in the normal mode of operation of the sensor; (7) determining if the operation of the occupancy sensor at the first position on the surface is acceptable in response to the steps of the load control device adjusting the amount of power delivered to the electrical load and the occupancy sensor operating in a test mode; (8) removing the occupancy sensor from the first position if the operation of the occupancy sensor at the first position is not acceptable; and (9) permanently mounting the occupancy sensor to the first position if the operation of the occupancy sensor at the first position is acceptable.

According to yet another embodiment of the present invention, an occupancy sensor for detecting the presence or absence of an occupant in a space comprises a mounting plate comprising a rear surface adapted to be mounted adjacent to the surface and a magnet attached to the mounting plate, such that the occupancy sensor may be magnetically attached to the surface. The occupancy sensor is intended for use in a lighting control system for control of the amount of power delivered to an electrical load in response to detecting the presence or absence of the occupant in the space. The occupancy sensor comprises an occupancy detector circuit for detecting the presence or absence of the occupant in the space and a controller responsive to the occupancy detector circuit and operable to change to an occupied state in response to the occupancy detector circuit detecting the presence of the occupant in the space in response to the occupancy detector circuit. The controller is further operable to change to a vacant state at the end of a timeout period after the occupancy detector circuit detecting the absence of the occupant in the space, where the timeout period has a first value in a normal mode of operation of the sensor. A wireless transmitter is coupled to the controller and transmits digital messages when the controller changes between the occupied and vacant states. The controller further comprises an enclosure having an outwardly-facing surface and sidewalls, such that the enclosure houses the occupancy detector circuit, the controller, and the wireless transmitter. The mounting plate is positioned at an end of the enclosure opposite the outwardly-facing portion, and the magnet is attached to the mounting plate, such that the occupancy sensor may be magnetically attached to the surface.

Other features and advantages of the present invention will become apparent from the following description of the invention that refers to the accompanying drawings.

DETAILED DESCRIPTION OF THE INVENTION

Figure 1:
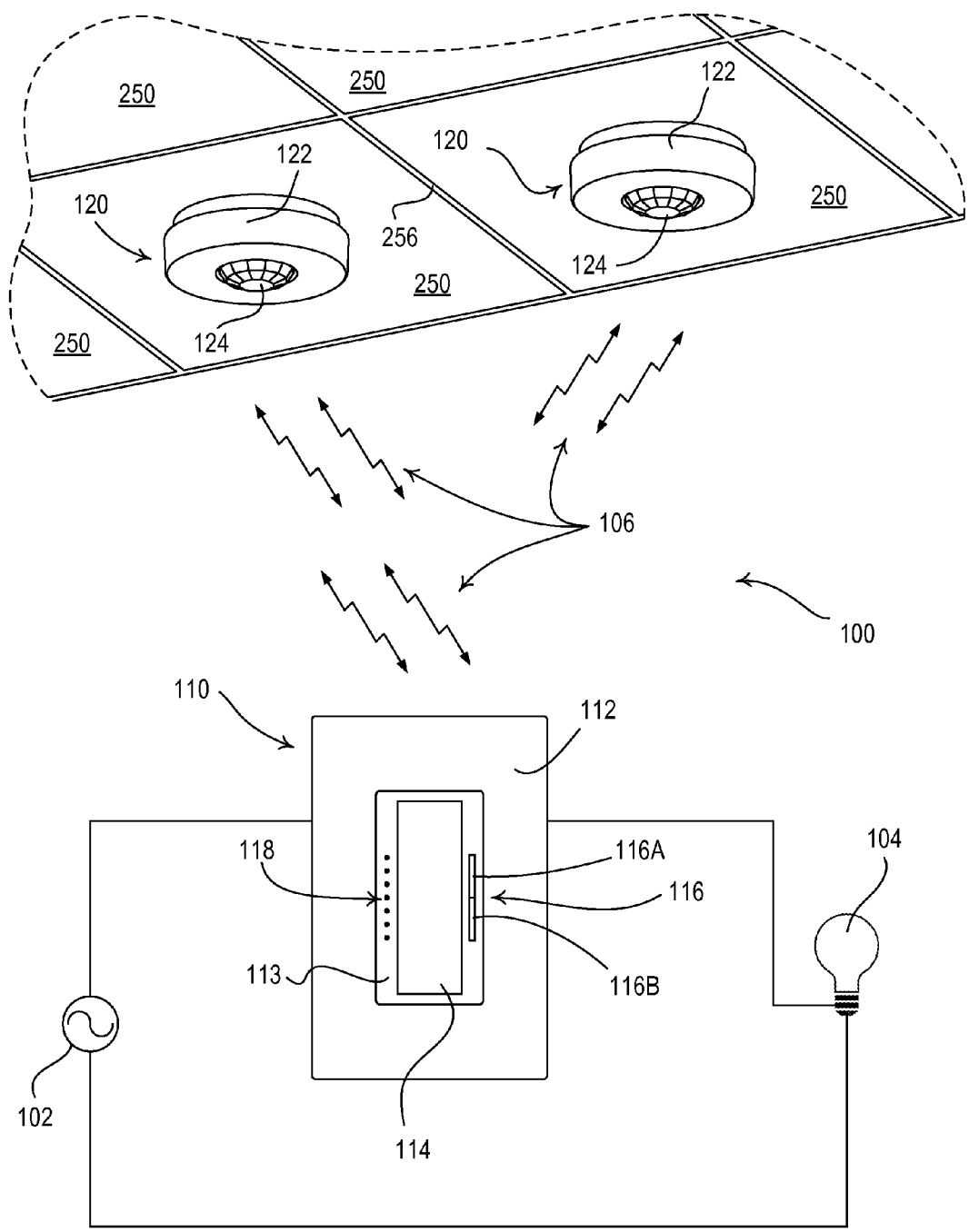
FIG. 1 is a diagram of a radio-frequency (RF) lighting control system having a dimmer switch and remote occupancy sensors that may be releasably attached to a drop ceiling panel according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simple diagram of a radio-frequency (RF) lighting control system 100 comprising a dimmer switch 110 and two remote occupancy sensors 120 (e.g., passive infrared sensors) according to a first embodiment of the present invention. The dimmer switch 110 is adapted to be coupled in series electrical connection between an AC power source 102 and a lighting load 104 for controlling the amount of power delivered to the lighting load. The dimmer switch 110 may be adapted to be wall-mounted in a standard electrical wallbox, and comprises a faceplate 112 and a bezel 113 received in an opening of the faceplate. The dimmer switch 110 further comprises a control actuator 114, i.e., a button, and an intensity adjustment actuator 116. Actuations of the control actuator 114 toggle, i.e., turn off and on, the lighting load 104. Actuations of an upper portion 116A or a lower portion 116B of the intensity adjustment actuator 116 respectively increase or decrease the amount of power delivered to the lighting load 104 and thus increase or decrease the intensity of the lighting load from a minimum intensity (e.g., 1%) to a maximum intensity (e.g., 100%). A plurality of visual indicators 118, e.g., light-emitting diodes (LEDs), are arranged in a linear array on the left side of the bezel 113, and are illuminated to provide feedback of the intensity of the lighting load 104.

Figure 8:
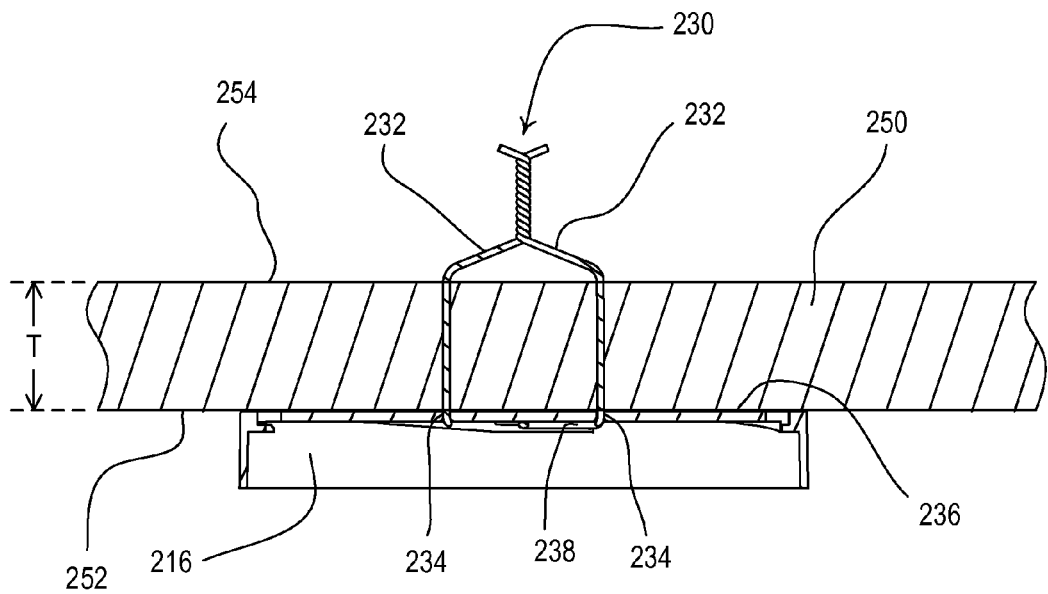
FIG. 8 is a side cross-sectional view taken through the posts of the mounting structure of FIG. 4 showing how the occupancy sensor is permanently affixed to the drop ceiling panel when the posts are twisted together.

According to the first embodiment of the present invention, the occupancy sensors 120 are releasably mountable to a surface, such as a drop ceiling panel (or tile) 250. The drop ceiling panel 250 has a substantially-flat front surface 252 (i.e., the visible surface of the panel) and an opposite rear surface 254 (as shown in FIG. 8). Accordingly, the drop ceiling panel 250 has a thickness T (FIG. 8), which may be, for example, approximately ⅜ to ¾ inches. The drop ceiling panel 250 may be constructed of, for example, mineral fibers. The front surface 252 of the drop ceiling panel 250 may be a smooth surface, but is typically a textured surface. The drop ceiling panels 250 are held in place by a metal grid structure 256.

The remote occupancy sensors 120 are mounted in the vicinity of (i.e., in a space around) the lighting load 104 controlled by the dimmer switch 110, and are operable to detect occupancy conditions in the vicinity of the lighting load. The occupancy sensors 120 may be spaced apart to detect occupancy conditions in different areas of the vicinity of the lighting load 104. The remote occupancy sensors 120 each include an internal detector, e.g., a pyroelectric infrared (PIR) detector 210 (FIG. 3), which is housed in an enclosure 122 (i.e., a main housing). The PIR detector 210 is operable to receive infrared energy from an occupant in the space via a lens 124 to thus sense the occupancy condition in the space. Each occupancy sensor 120 is operable to process the output of the PIR detector 210 to detect the presence of the occupant (i.e., an occupancy condition) or the absence of the occupant (i.e., a vacancy condition) in the space. Alternatively, the internal detector could comprise an ultrasonic detector, a microwave detector, or any combination of PIR detectors, ultrasonic detectors, and microwave detectors. The occupancy sensors 120 each operate in an "occupied" state or a "vacant" state in response to the detections of occupancy or vacancy conditions, respectively, in the space. If one of the occupancy sensors 120 is in the vacant state and the occupancy sensor determines that the space is occupied, the occupancy sensor changes to the occupied state.

The remote occupancy sensors 120 are in wireless communication with the dimmer switch 110. Specifically, the occupancy sensors 120 transmit digital messages wirelessly via RF signals 106 in response to the present state of the occupancy sensors (i.e., whether an occupancy condition or a vacancy condition has been detected). The dimmer switch 110 controls the amount of power delivered to the lighting load 104 in response to the digital messages received by an internal RF receiver (not shown) via the RF signals 106. A digital message transmitted by the remote occupancy sensors 120 may include a command and identifying information, for example, a serial number associated with the transmitting occupancy sensor. The dimmer switch 110 is responsive to messages containing the serial numbers of the remote occupancy sensors 120 to which the dimmer switch is assigned. The operation of the RF lighting control system 100 is described in greater detail in U.S. patent application Ser. No. 12/203,518, filed Sep. 3, 2008, entitled RADIO-FREQUENCY LIGHTING CONTROL SYSTEM WITH OCCUPANCY SENSING, the entire disclosure of which is hereby incorporated by reference.

The commands included in the digital messages transmitted by the occupancy sensors 120 may comprise an occupied command (e.g., an occupied-take-action command or an occupied-no-action command) or a vacant command. When the lighting load 104 is off, the dimmer switch 110 is operable to turn on the lighting load in response to receiving a first occupied-take-action command from any one of the occupancy sensors 120. The dimmer switch 110 is operable to turn off the lighting load 104 in response to the last vacant command received from those occupancy sensors 120 from which the occupancy sensor received either occupied-take-action or occupied-no-action commands. For example, if the occupancy sensors 120 both transmit occupied-take-action commands to the dimmer switch 110, the dimmer switch will not turn off the lighting load 104 until subsequent vacant commands are received from both of the occupancy sensors.

Each occupancy sensor 120 also comprises an ambient light detector 314 (FIG. 10), e.g., a photocell, for detecting the level of ambient light around the occupancy sensor. The occupancy sensor 120 only measures the ambient light level when an occupancy condition is first detected. The ambient light level is compared to a predetermined ambient light level threshold. If the measured ambient light level is less than the predetermined level when an occupancy condition is first detected by one of the occupancy sensors 120, the occupancy sensor transmits the occupied-take-action command to the dimmer switch 110. On the other hand, if the measured ambient light level is greater than the predetermined level when an occupancy condition is first detected, the occupancy sensor 120 transmits the occupied-no-action command to the dimmer switch 110. Accordingly, the dimmer switch 110 does not turn on the lighting load 104 if the ambient light level in the space is sufficient.

The occupancy sensors 120 are each characterized by a predetermined occupancy sensor timeout period $T_{TIMEOUT}$, which provides some delay in the adjustment of the state of the occupancy sensor, specifically, in the transition from the occupied state to the vacant state. The predetermined timeout period $T_{TIMEOUT}$ denotes the time between the last detected occupancy condition and the transition of the occupancy sensor 120 from the occupied state to the vacant state. The predetermined occupancy sensor timeout period $T_{TIMEOUT}$ may be user-selectable ranging, for example, from five to thirty minutes, during normal operation of the occupancy sensor 120. Each occupancy sensor 120 will not transmit a vacant command until the occupancy sensor timeout period $T_{TIMEOUT}$ has expired. Each occupancy sensor 120 maintains an occupancy timer to keep track of the time that has expired since the last detected occupancy condition. The occupancy sensors 120 periodically restart the occupancy timers in response to detecting an occupancy condition. Accordingly, the occupancy sensors 120 do not change to the vacant state, and the lighting load 104 is not turned off, in response to brief periods of a lack of movement of the occupant in the space. If the occupancy sensor 120 fails to continue detecting the occupancy conditions, the occupancy sensor 120 uses the occupancy timer to wait for the length of the occupancy sensor timeout period $T_{TIMEOUT}$. After the occupancy timer expires, the occupancy sensor 120 changes to the vacant state and transmits a vacant command to the dimmer switch 110.

Figure 2:
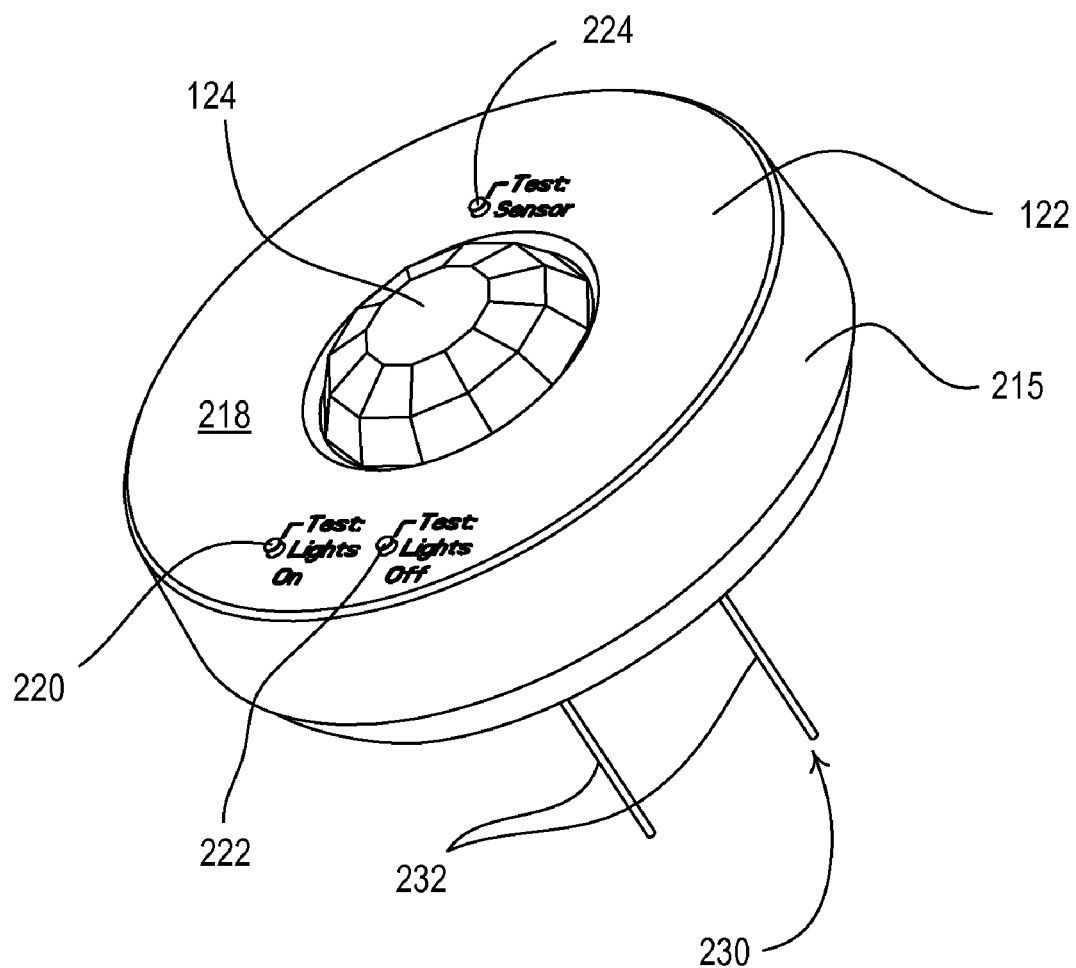
FIG. 2 is a perspective view of one of the occupancy sensors of FIG. 1.
Figure 3:
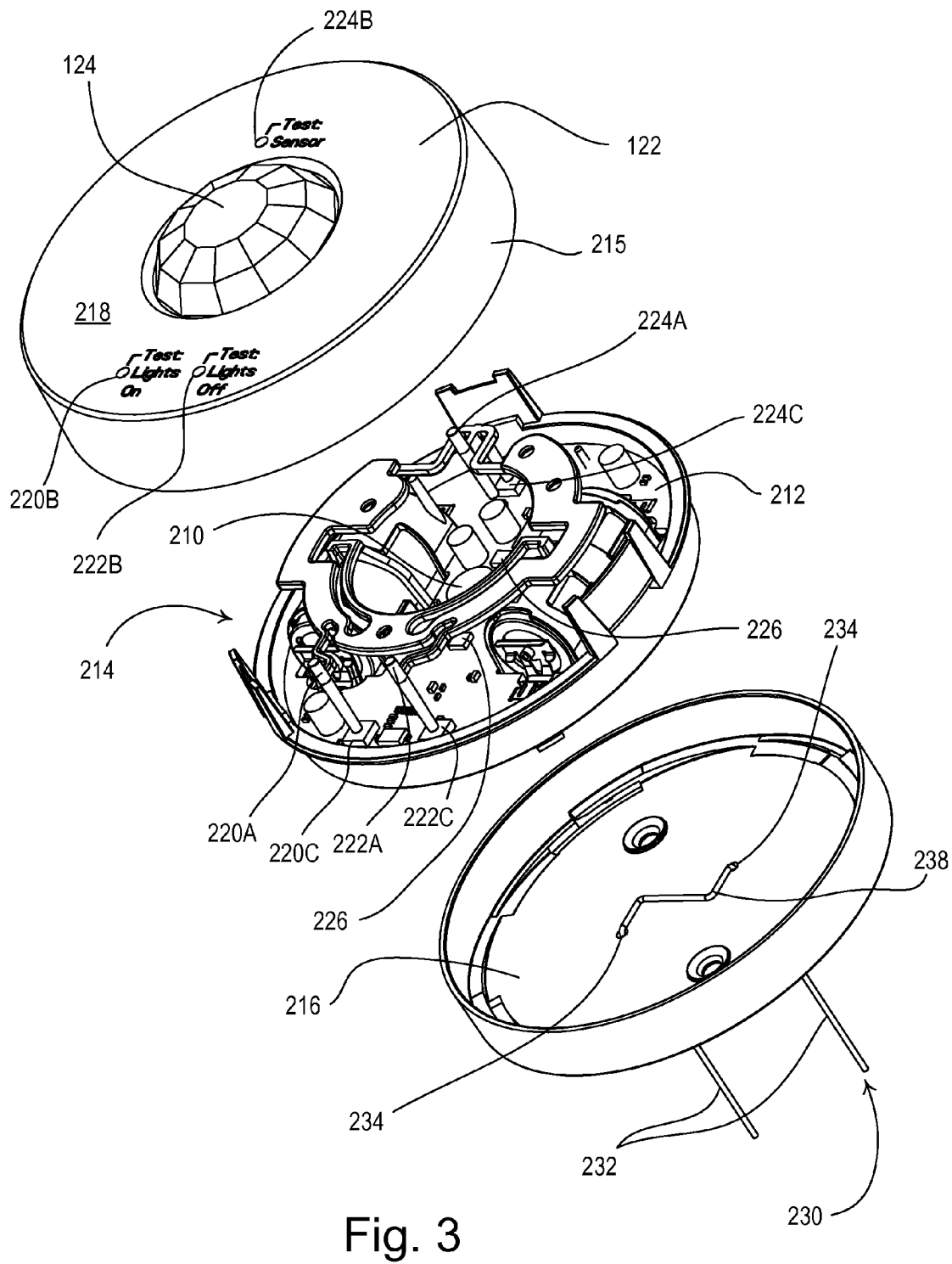
FIG. 3 is an exploded perspective view of the occupancy sensor of FIG. 2.

FIG. 2 is a perspective view and FIG. 3 is an exploded perspective view an electronics assembly of the occupancy sensor 120 according to the present invention. The circuitry of the occupancy sensor 120 (including the PIR detector 210) is mounted to a printed circuit board (PCB) 212, which is connected to a base portion 214. The enclosure 122 has sidewalls 215 that surround the PCB 212 and the circuitry of the occupancy sensor 120 when the enclosure 122 is connected to the base portion 214. A flat mounting plate 216 is removably attached to the base portion 214 and provides for attachment of the occupancy sensor 120 to the ceiling or the wall. The base potion 214 has a rear surface having one or more buttons (not shown) for adjusting the user-selectable values of operating characteristics of the occupancy sensor 120. For example, the value of the predetermined occupancy sensor timeout period $T_{TIMEOUT}$ (i.e., a selected timeout period value $T_{SELECTED}$) may be adjusted using one of the buttons on the rear surface of the base portion 214. The structure of the occupancy sensor 120 is described in greater detail in U.S. patent application Ser. No. 12/203,500, filed Sep. 3, 2008, entitled BATTERY-POWERED OCCUPANCY SENSOR, the entire disclosure of which is hereby incorporated by reference.

The occupancy sensor 120 also includes a plurality of test buttons (i.e., actuators), which are provided on a front surface 218 (i.e., an outwardly-facing surface) of the enclosure 122 and comprise, for example, a first communications test button (i.e., a lights-on test button 220), a second communication test button (i.e., a lights-off test button 222), and a sensor test button 224. Since the test buttons 220, 222, 224 are provided on the front surface 218 of the enclosure 122, the buttons are accessible when the occupancy sensor 120 is affixed to the ceiling panel 250. Alternatively, the test buttons 220, 222, 224 could be located on the sidewalls 215 of the enclosure 122, such that the buttons are also accessible when the occupancy sensor 120 is affixed to the ceiling panel 250.

The lights-on test button 220, the lights-off test button 222, and the sensor test button 224 comprise respective actuation posts 220A, 222A, 224A that extend through openings 220B, 222B, 224B in the enclosure 122 (FIG. 3). The actuation posts 220A, 222A, 224A allow for actuation of respective mechanical switches 220C, 222C, 224C, which are mounted to the PCB 212. The lights-on test button 220, the lights-off test button 222, and the sensor test button 224 are used during configuration of the occupancy sensor 120. In particular, the lights-on test button 220 and the lights-off test button 222 are used to test the wireless communications between the occupancy sensor and the dimmer switch 110, while the sensor test button 224 is used to test the ability of the occupancy sensor 120 to detect an occupant in the space. The occupancy sensor 120 further comprises two visual indicators, e.g., light-emitting diodes (LEDs) 226, which are mounted to the PCB 212 and positioned to illuminate the lens 124 when the enclosure 122 is connected to the base portion 214. During the configuration of the occupancy sensor 120, the occupancy sensor 120 is operable to illuminate the lens 124 using LEDs 226 to provide visible feedback to the user.

In response to actuations of the lights-on test button 220 and the lights-off test button 222, the occupancy sensor 120 is operable to transmit digital messages to the dimmer switch 110 to control the lighting load 104 to be on and off, respectively. This allows the user to test the wireless communications between the occupancy sensor 120 and the dimmer switch 110 and to ensure that the dimmer switch is receiving digital messages via the RF signals 106 from the occupancy sensor.

Actuations of the sensor test button 224 cause the occupancy sensor 120 to operate in a test mode in which the occupancy sensor simply controls the LEDs 226 to illuminate the lens 124, rather than transmitting digital messages to the dimmer switch 110 to cause the lighting load 104 to turn on and off when the occupancy sensor changes between the occupied state and the vacant state. In addition, the value of the timeout period $T_{TIMEOUT}$ is temporarily decreased to a test mode timeout period value $T_{TEST}$ (e.g. approximately five seconds) during the test mode, such that the occupancy sensor 120 changes between the occupied and vacant states more often than in a normal mode of operation (i.e., not the test mode). Since the lens 124 is not illuminated for a long period of time when the occupancy sensor 120 is operating in the test mode, the user is able to quickly determine how responsive the PIR detector 210 is to desired infrared energy (i.e., from the movement of the user) and undesired infrared energy (i.e., from a noise source or from movement that is not indicative of the occupant in the space). Because digital messages are not transmitted by the occupancy sensor 120 in the test mode, the lighting load 104 is not repetitively controlled on and off (i.e., with the occupancy sensor timeout period $T_{TIMEOUT}$ set to the reduced test mode timeout period value $T_{TEST}$), which could be bothersome to the user while the user is testing the operation of the occupancy sensor. In addition, power is not needlessly consumed by the transmission of digital messages during the test mode.

According to the first embodiment of the present invention, the occupancy sensor 120 may be releasably attached to the drop ceiling panel 250, such that the occupancy sensor is repositionable on the drop ceiling panel or another drop ceiling panel. The occupancy sensor 120 comprises a releasable mounting means (e.g., a mounting structure 230) that enables the sensor to be releasably and permanently mounted to the drop ceiling panel 250. The mounting structure 230 allows the occupancy sensor 120 to be temporarily attached to the drop ceiling panel 250 without removal of the drop ceiling panel and without damaging the surface of the drop ceiling panel. The mounting structure 230 also allows the occupancy sensor 120 to be permanently affixed to the drop ceiling panel 250 without the use of tools, e.g., by a deformation of the mounting structure. Therefore, the occupancy sensors 120 are able to be easily fixed in a position on a ceiling and then released from that position during configuration of the lighting control system 100, such that the optimum locations of the occupancy sensors may be determined.

Figure 4:
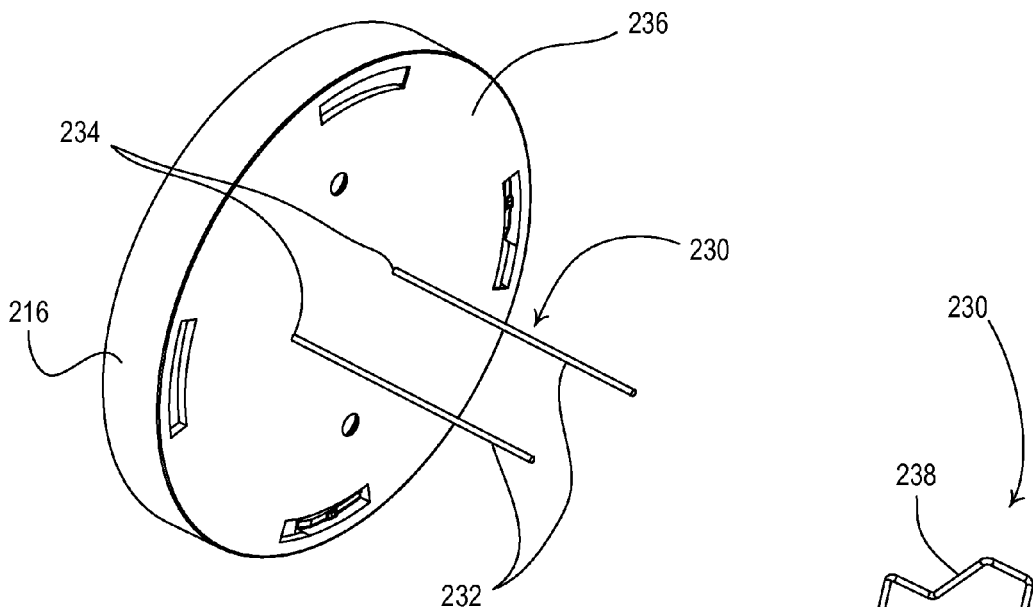
FIG. 4 is a rear perspective view of a mounting plate of the occupancy sensor of FIG. 2 showing posts of a mounting structure extending from a rear surface of the mounting plate.
Figure 5:
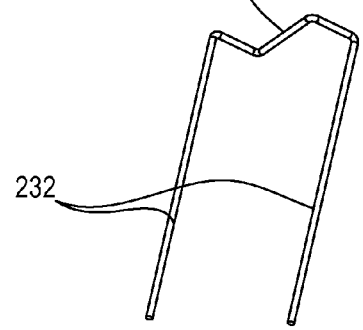
FIG. 5 is a perspective view of the mounting structure of FIG. 4.

The mounting structure 230 comprises two posts 232 (i.e., legs) that are received through openings 234 in the mounting plate 216 and extend perpendicularly from a rear surface 236 of the mounting plate. FIG. 4 is a rear perspective view of the mounting plate 216 showing the posts 232 extending from the rear surface 236. FIG. 5 is a perspective view of the mounting structure 230. For example, the mounting structure 230 may comprise a single bendable wire (i.e., a pliant member) as shown in FIG. 5. The posts 232 may be forced through respective spaced points on the drop ceiling panel 250 to penetrate the drop ceiling panel (i.e., the drop ceiling panel provides a penetrable thin flat support sheet structure). The posts 232 each have a small diameter (e.g., approximately 0.040 inch) and are appropriately rigid, such that the posts are able to pierce the drop ceiling panel 250 without creating large aesthetically-displeasing holes in the front surface 252 of the panel. In other words, the posts 232 allow for non-destructive penetration of the drop ceiling panel 250 without distortion of the posts. Since the front surface 252 of the drop ceiling panel 250 is typically textured, the small holes created by the posts 232 are not easily visible. The posts 232 each have, for example, a length of approximately two inches, such that the posts may extend through the drop ceiling panel 250 (i.e., from the front surface 252 to the rear surface 254 as shown in FIG. 8). Accordingly, when the mounting plate 216 is positioned adjacent the front surface 252 of the drop ceiling panel 250, the posts 232 extend from the rear surface 254 of the panel for at least approximately one inch.

Figure 6:
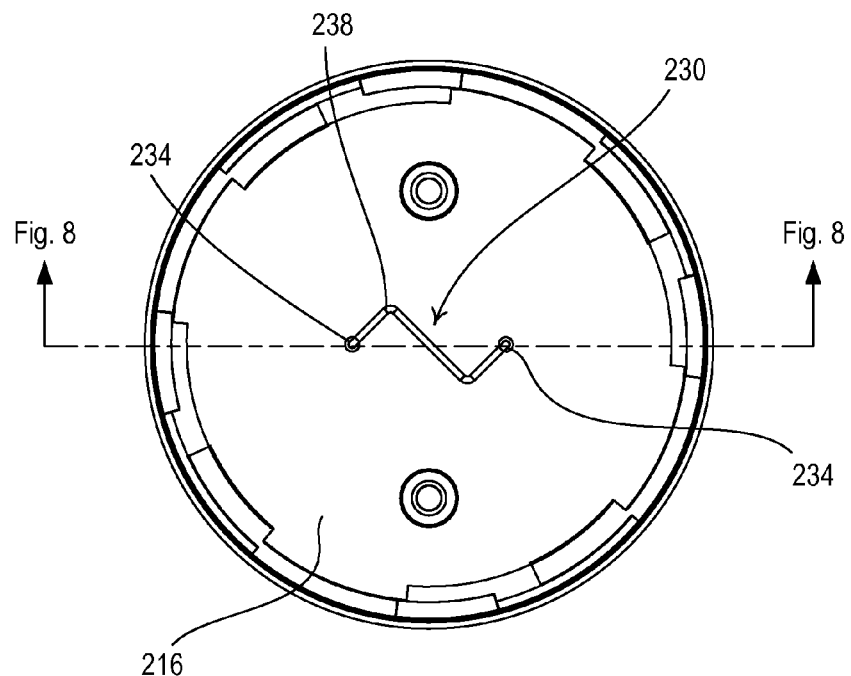
FIG. 6 is a front view of the mounting plate showing a "z-shaped" portion of the mounting structure of FIG. 4.

The mounting structure 230 comprises a non-linear central base section, e.g., a "z-shaped" portion 238, between the two posts 232. FIG. 6 is a front view of the mounting plate 216 showing the "z-shaped" portion 238. The "z-shaped" portion 238 is disposed against an interior surface 239 of the mounting plate 216 in a plane that is parallel with the rear surface 236 of the mounting plate. The "z-shaped" portion 238 helps to prevent the posts 232 from rolling to one side or the other (i.e., from extending in a non-perpendicular direction from the rear surface 236 of the mounting plate 216). Because the mounting structure 230 does not contact the PCB 212, the posts 232 are electrically isolated from the electrical circuitry of the occupancy sensor 120.

Figure 7:
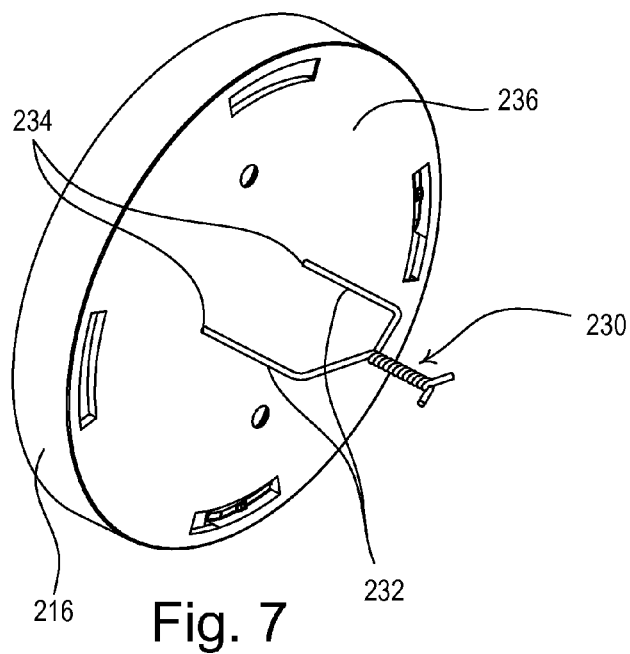
FIG. 7 is a rear perspective view of the mounting plate showing the posts of the mounting structure of FIG. 4 twisted together.

The posts 232 are also appropriately ductile, such that they may be manually deformed (i.e., bent or twisted together) without the use of tools to permanently affix the occupancy sensor 120 to the drop ceiling panel 250. For example, the mounting structure 230 may comprise Type 302 stainless steel having a temper of ¼ hard, an elastic modulus of 193 GPa, and a yield strength of 517 MPa. To permanently attach the occupancy sensor 120 to the drop ceiling panel 250, the user can remove the drop ceiling panel 250 and simply deform (i.e., bend) the posts 232 by hand without the use of tools, such that the drop ceiling panel is captured, and thus permanently affixed, between the mounting plate 216 and the deformed posts. The posts 232 may be bent towards each other and twisted together to permanently affix the occupancy sensor 120 to the drop ceiling panel 250. FIG. 7 is a rear perspective view of the mounting plate 216 showing the posts 232 twisted together. FIG. 8 is a side cross-sectional view taken through the posts 232 showing how the occupancy sensor 120 is permanently affixed to the drop ceiling panel 250 when the posts are twisted together. When twisted together, the posts 232 are adapted to hold their shape under the pressure created by the electronics assembly of the occupancy sensor 120. Alternatively, the posts 232 may be bent such that the posts are positioned substantially parallel to the plane of the rear surface 254 of the drop ceiling panel 250 (e.g., flat against the rear surface of the drop ceiling panel).

Figure 9:
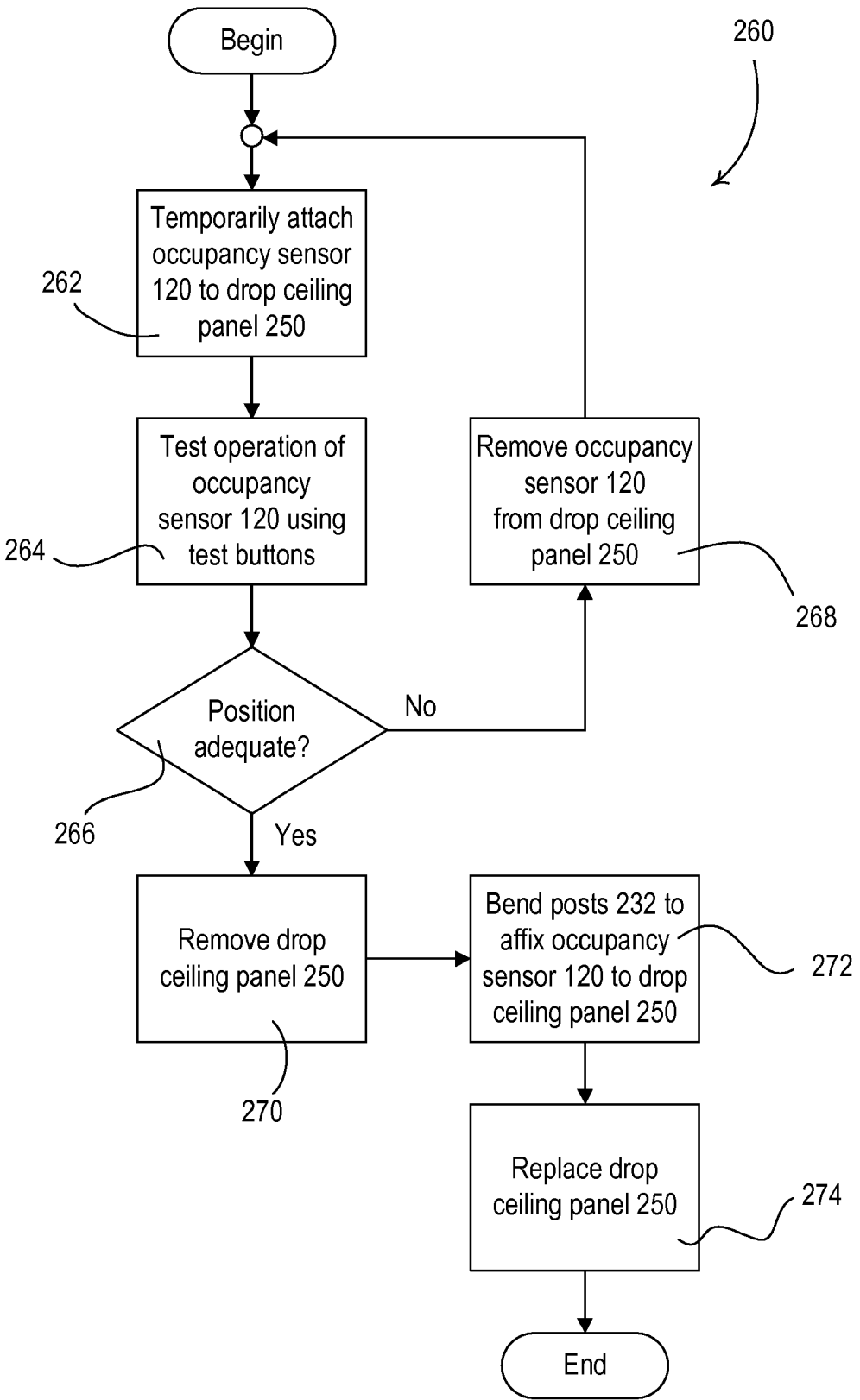
FIG. 9 is a simplified flowchart of a commissioning procedure used during installation and configuration of the lighting control system of FIG. 1.

FIG. 9 is a simplified flowchart of a commissioning procedure 260 used during installation and configuration of the lighting control system 100 according to an embodiment of the present invention. During the commissioning procedure 260, the occupancy sensor 120 may be temporarily affixed to the drop ceiling panel 250 by pushing the occupancy sensor against the drop ceiling panel such that the posts 232 are inserted through the drop ceiling panel at step 262. Since the occupancy sensor 120 does not have a large weight (e.g., less than approximately 0.25 lbs), the occupancy sensor is temporarily attached to the drop ceiling panel 250 due to the friction between the posts 232 and the drop ceiling panel. While the occupancy sensor 120 is temporarily affixed to the drop ceiling panel 250, the user is able test the operation of the occupancy sensor using the lights-on test button 220, the lights-off test button 222, and the sensor test button 224 at step 264. If the location of the occupancy sensor 120 is inadequate at step 266, the user may then remove the occupancy sensor by gripping the enclosure 122 and pulling the occupancy sensor away from the ceiling, thus disengaging the posts 232 from the drop ceiling panel 250 at step 268, installing the occupancy sensor in a new location by inserting the posts through another drop ceiling panel at step 262, and re-testing the system operation using the lights-on test button 220, the lights-off test button 222, and the sensor test button 224 at step 264. Since the posts 232 have only a small diameter, the posts 232 do not create large holes that may be aesthetically displeasing in the drop ceiling panel 250. When the optimum location of the occupancy sensor 120 is determined at step 266, the user does not have to remove the occupancy sensor from its position on the drop ceiling panel 250 to permanently affix the occupancy sensor 120 to the drop ceiling panel. The user can simply detach the drop ceiling panel 250 from the ceiling at step 270, bend the posts 232 by hand without the use of tools at step 272 (such that the drop ceiling panel is captured between the mounting plate 216 and the posts), and then reattach the drop ceiling panel to the ceiling at step 274.

Figure 10:
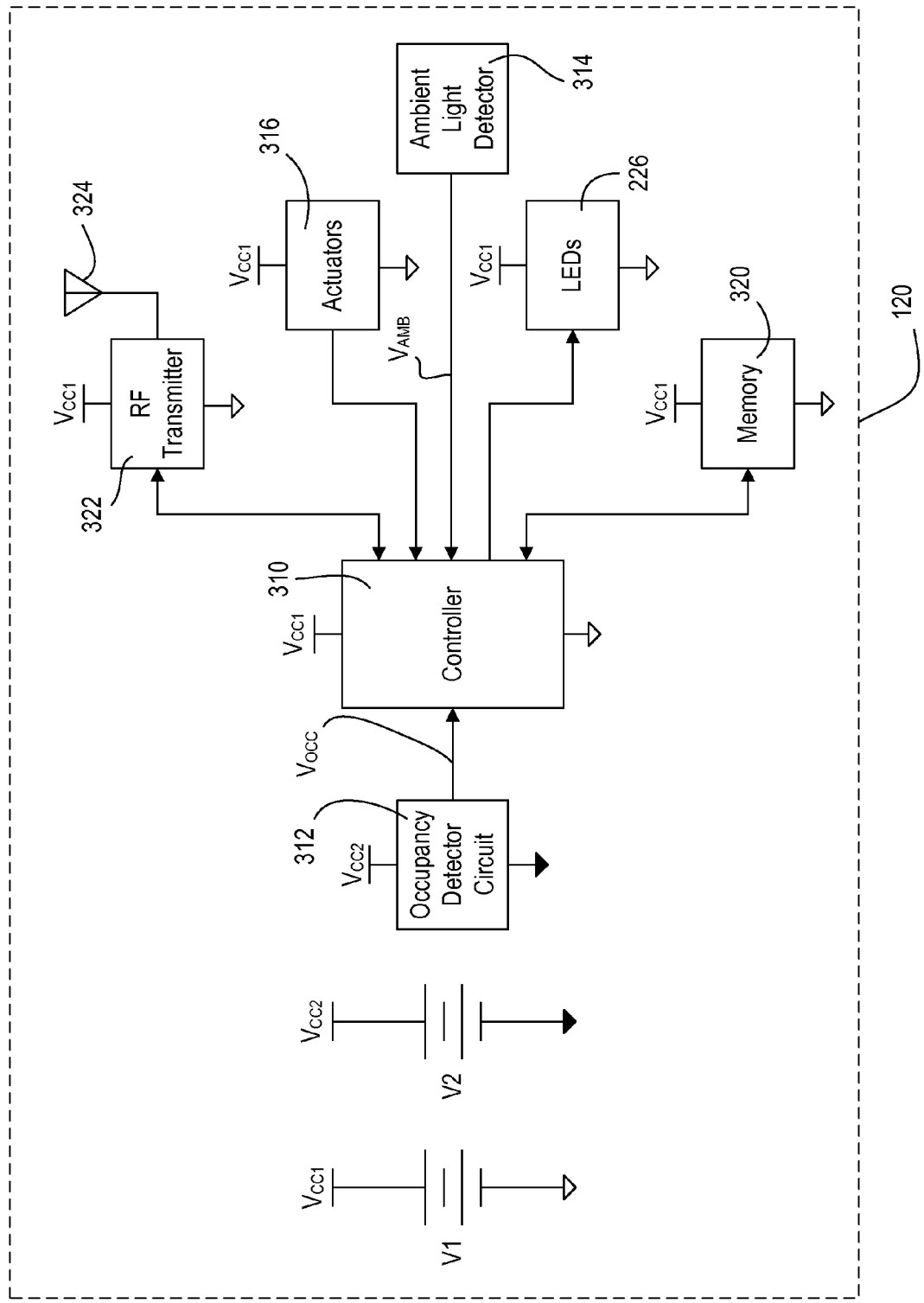
FIG. 10 is a simplified block diagram of the occupancy sensor of FIG. 2.

FIG. 10 is a simplified block diagram of the occupancy sensor 120. The occupancy sensor 120 comprises a controller 310 and an occupancy detector circuit 312, which provides the controller with an occupancy control signal $V_{OCC}$ representative of whether the space is occupied or not occupied. The controller 310 receives an ambient light level control signal $V_{AMB}$ representative of the level of ambient light around the occupancy sensor from the ambient light detector 314. A plurality of actuators 316, which include the mechanical switches 220C, 222C, 224C of the lights-on test button 220, the lights-off test button 222, and the sensor test button 224, provide user inputs to the occupancy sensor 120 for use during configuration and installation of the lighting control system 100 as will be described in greater detail below. The controller 310 is operable to illuminate of the visual indicators, i.e., the LEDs 226, to provide feedback to the user during configuration and installation of the occupancy sensor 120.

The occupancy sensors 120 are each operable to store in a memory 320 the values of the various operating characteristics of the lighting control system 100, e.g., the selected occupancy sensor timeout period value $T_{SELECTED}$. The memory 320 may be implemented as an external integrated circuit (IC) or as an internal circuit of the controller 310. The occupancy sensors 120 also store the serial number in the memory 320. The serial number may be programmed into the memory 320, for example, during manufacture of the occupancy sensor 120.

The occupancy sensor 120 further comprises an RF transmitter 322 coupled to the controller 310 and an antenna 324. In response to determining an occupancy or a vacancy condition of the space, the controller 310 causes the RF transmitter 322 to transmit a digital message to the dimmer switch 110 via the RF signals 106. Each transmitted digital message comprises the serial number of the occupancy sensor 120 and the appropriate command dependent upon the various operating characteristics of the occupancy sensor and the magnitudes of the occupancy control signal $V_{OCC}$ and the ambient light level control signal $V_{AMB}$. Alternatively, the RF transmitter 322 of the occupancy sensors 120 and the RF receiver of the dimmer switch 110 could both comprise RF transceivers to allow for two-way communication between the occupancy sensors and the dimmer switch.

The occupancy sensor 120 also comprises two batteries: a first battery V1 and a second battery V2. The first battery V1 provides a first battery voltage $V_{CC1}$ referenced to a first circuit common, and the second battery V2 provides a second battery voltage $V_{CC2}$ referenced to a second circuit common. For example, the magnitudes of the first and second battery voltages $V_{CC1}$, $V_{CC2}$ may be the same, e.g., approximately three (3) volts. The second battery V2 powers only the occupancy detector circuit 312, while the first battery V1 powers the controller 310, the RF transmitter 322, and the other circuitry of the occupancy sensor 120. Since the occupancy detector circuit 312 is powered by a separate battery from the other circuitry, the occupancy detector circuit is isolated from the noisy circuitry (e.g., the controller 310 and the RF transmitter 322) of the occupancy sensor 120 without excessive electronic filtering. Accordingly, the amount of noise present in the occupancy detector circuit 312 is dramatically reduced without the use of advanced filters.

Figure 11:
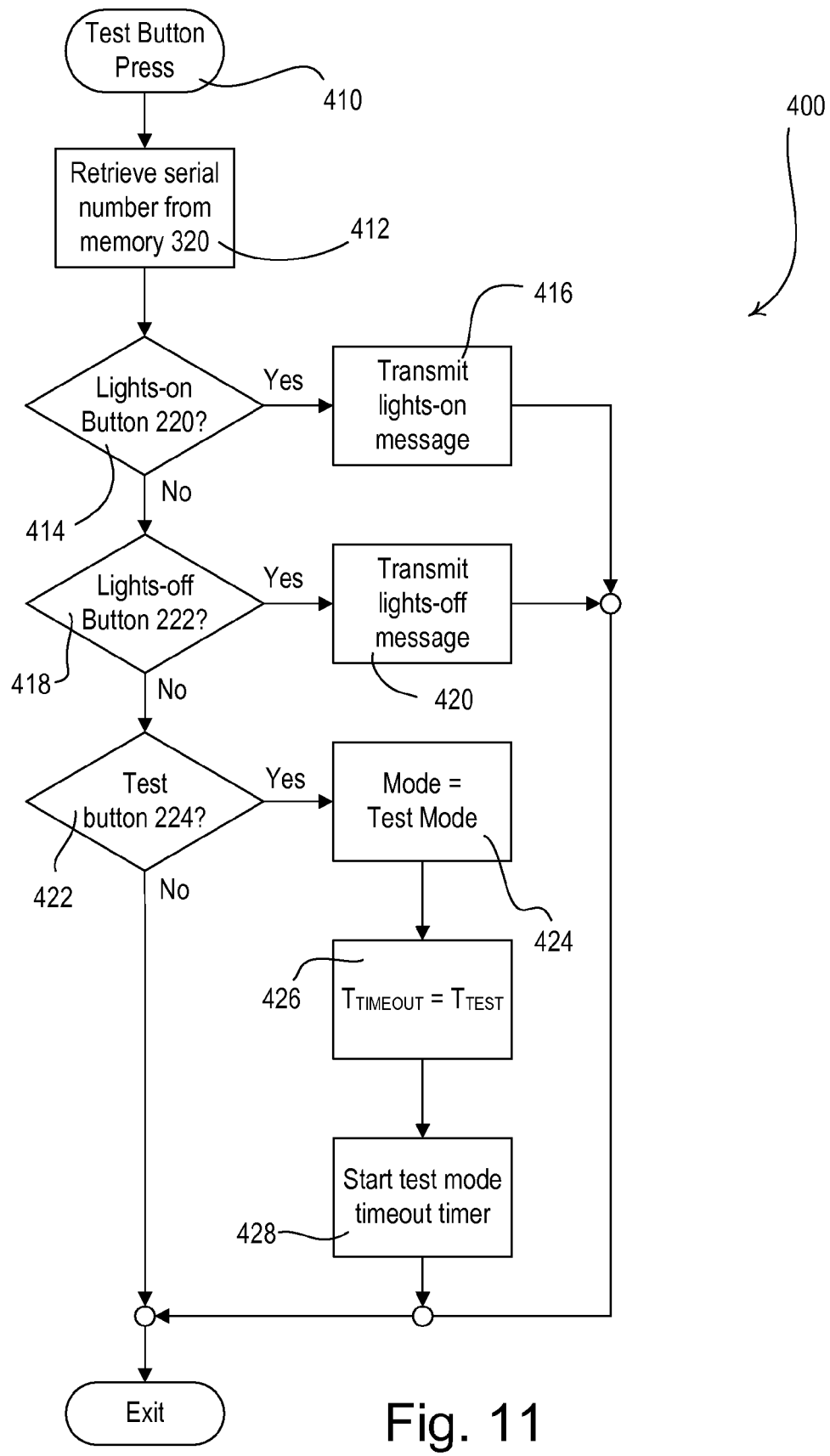
FIG. 11 is a flowchart of a test button procedure executed by a controller of the occupancy sensor of FIG. 2.

FIG. 11 is a flowchart of a test button procedure 400 executed by the controller 310 of each occupancy sensor 120 when one of the lights-on test button 220, the lights-off test button 222, and the sensor test button 224 is pressed at step 410. First, the serial number of the occupancy sensor 120 is retrieved from the memory 320 at step 412, such that the serial number can be transmitted in a digital message to the dimmer switch 110 if needed. If the lights-on test button 220 is pressed at step 414, a lights-on message (including the serial number) is transmitted to the dimmer switch 110 at step 416 and the test button procedure 400 exits. Similarly, if the lights-off test button 222 is pressed at step 418, a lights-off message (including the serial number) is transmitted to the dimmer switch 110 at step 420, before the test button procedure 400 exits. If neither the lights-on test button 220 nor the lights-off test button 222 is being pressed at steps 414 and 418, but the sensor test button 224 is being pressed at step 422, the controller 310 sets the mode to test mode at step 424 and sets the occupancy sensor timeout period $T_{TIMEOUT}$ to the test mode timeout period value $T_{TEST}$ at 426. The controller 310 then starts a test mode timeout timer at step 428, before the test button procedure 400 exits. The controller 310 uses the test mode timeout timer to make sure that the occupancy sensor 120 does not remain in the test mode indefinitely.

Figure 12:
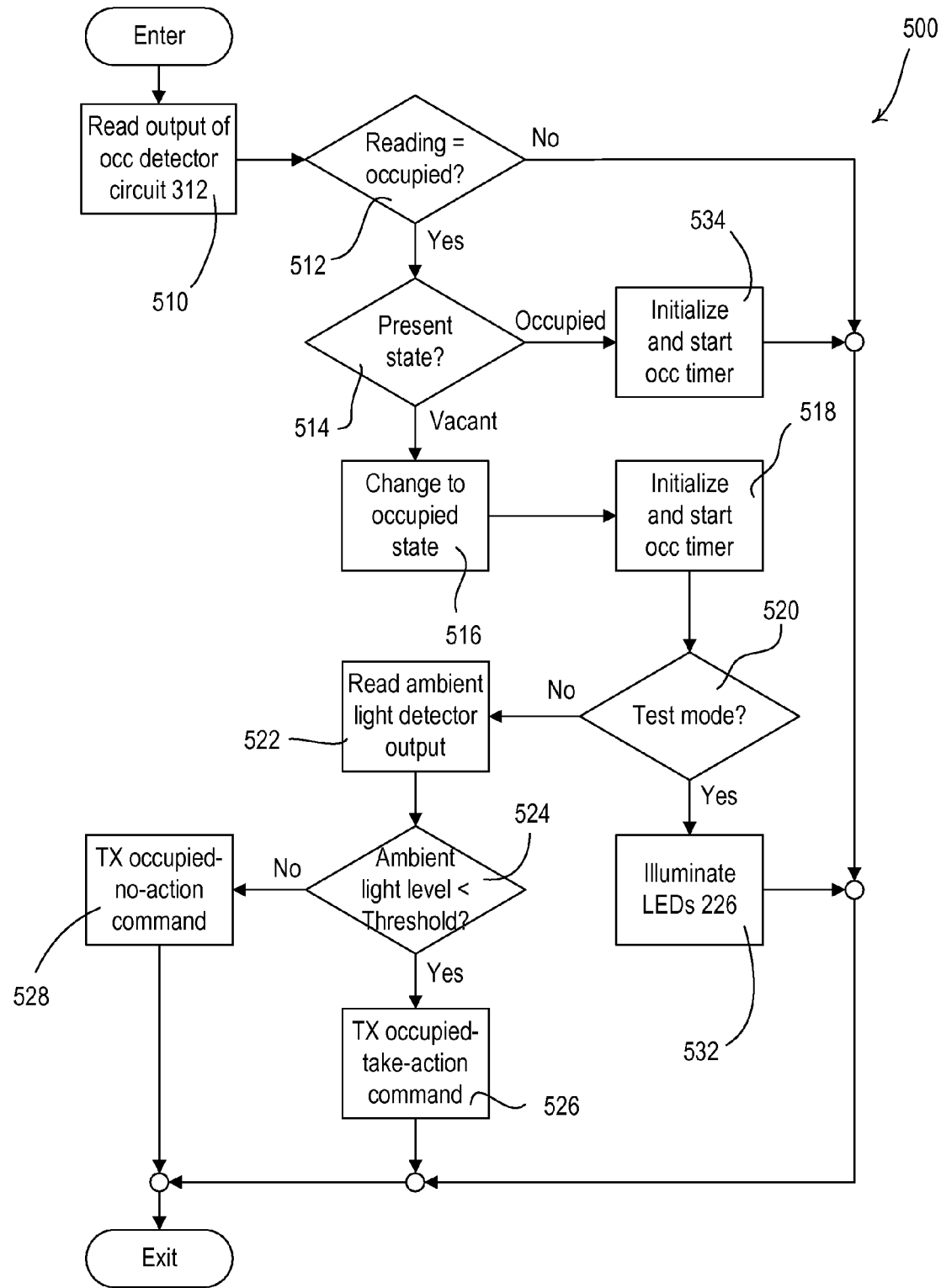
FIG. 12 is a flowchart of an occupancy detection procedure executed by the controller of the occupancy sensor of FIG. 2.

FIG. 12 is a flowchart of an occupancy detection procedure 500 executed periodically, e.g., approximately every 50 msec, by the controller 310 of each occupancy sensor 120. As previously mentioned, the controller 310 uses the occupancy timer to provide some delay before transitioning the occupancy sensor from the occupied state to the vacant state. Whenever the controller 310 obtains a detector input that signifies an occupancy condition, the controller initializes the occupancy timer to the occupancy sensor timeout period $T_{TIMEOUT}$ and starts the occupancy timer counting down. The occupancy sensor timeout period $T_{TIMEOUT}$ will be equal to the selected timeout period value $T_{SELECTED}$ (i.e., five to thirty minutes) in the normal mode of operation of the occupancy sensor 120 and equal to the test mode timeout period value $T_{TEST}$ (i.e., five seconds) in the test mode.

The occupancy sensor 120 stays in the occupied state as long as the controller 310 receives indications of the occupancy condition from the occupancy detector circuit 312 before the occupancy timer expires. However, when the occupancy timer expires, the controller 310 changes to the vacant state as will be described in greater detail below. In the normal mode of operation, the lighting load 104 will stay on as long as the occupancy sensor 120 stays in the occupied state. In the test mode, the occupancy sensor 120 illuminates the lens 124 as long as the occupancy sensor remains in the occupied state.

Referring to FIG. 12, the controller 310 first reads the output of the occupancy detector circuit 312 at step 510, for example, by sampling the occupancy control signal $V_{OCC}$. The controller 310 then determines if the detector reading signifies an occupancy condition in the space, for example, by comparing the magnitude of the output voltage of the occupancy detector circuit 312 to the predetermined occupancy voltage threshold. If the detector reading does not signify an occupancy condition in the space at step 512, the occupancy detection procedure 500 simply exits. However, if the detector reading signifies the presence of the occupant in the space at step 512 and the occupancy sensor 120 is presently in the vacant state at step 514, the controller 310 changes to the occupied state at step 516. At step 518, the controller 310 initializes the occupancy timer to the occupancy sensor timeout period $T_{TIMEOUT}$ and starts the occupancy timer (such that the occupancy timer decreases in value with time). The occupancy sensor timeout period $T_{TIMEOUT}$ is equal to the selected timeout period value $T_{SELECTED}$ when the occupancy sensor 120 is in the normal mode or the test mode timeout period value $T_{TEST}$ depending upon on whether the occupancy timer is in the normal mode or the test mode, respectively.

If the occupancy sensor 120 is not in the test mode at step 520, the occupancy sensor operates normally, i.e., to transmit an occupied message to the dimmer switch 110. Specifically, the controller 310 reads the output of the ambient light detector 314 at step 522. If the value of the ambient light level is less than the predetermined ambient light level threshold at step 524, the controller 310 transmits (TX) the occupied-take-action command at step 526. Otherwise, the controller 310 transmits the occupied-no-action command at step 528 and the occupancy detection procedure 500 simply exits.

If the occupancy sensor 120 is in the test mode at step 520, the controller 310 simply illuminates the LEDs 226 to illuminate the lens 124 at step 532 and the occupancy detection procedure 500 exits. When the occupancy detection procedure 500 is executed and the occupancy sensor 120 is in the occupied state at step 514, the controller 310 simply initializes and starts the occupancy timer at step 534 before the occupancy detection procedure 500 exits. The occupancy sensor timeout period $T_{TIMEOUT}$ may be equal to the selected timeout period value $T_{SELECTED}$ or the test mode timeout period value $T_{TEST}$ depending upon on whether the occupancy sensor 120 is in the normal mode or the test mode, respectively.

Figures 13, 14:
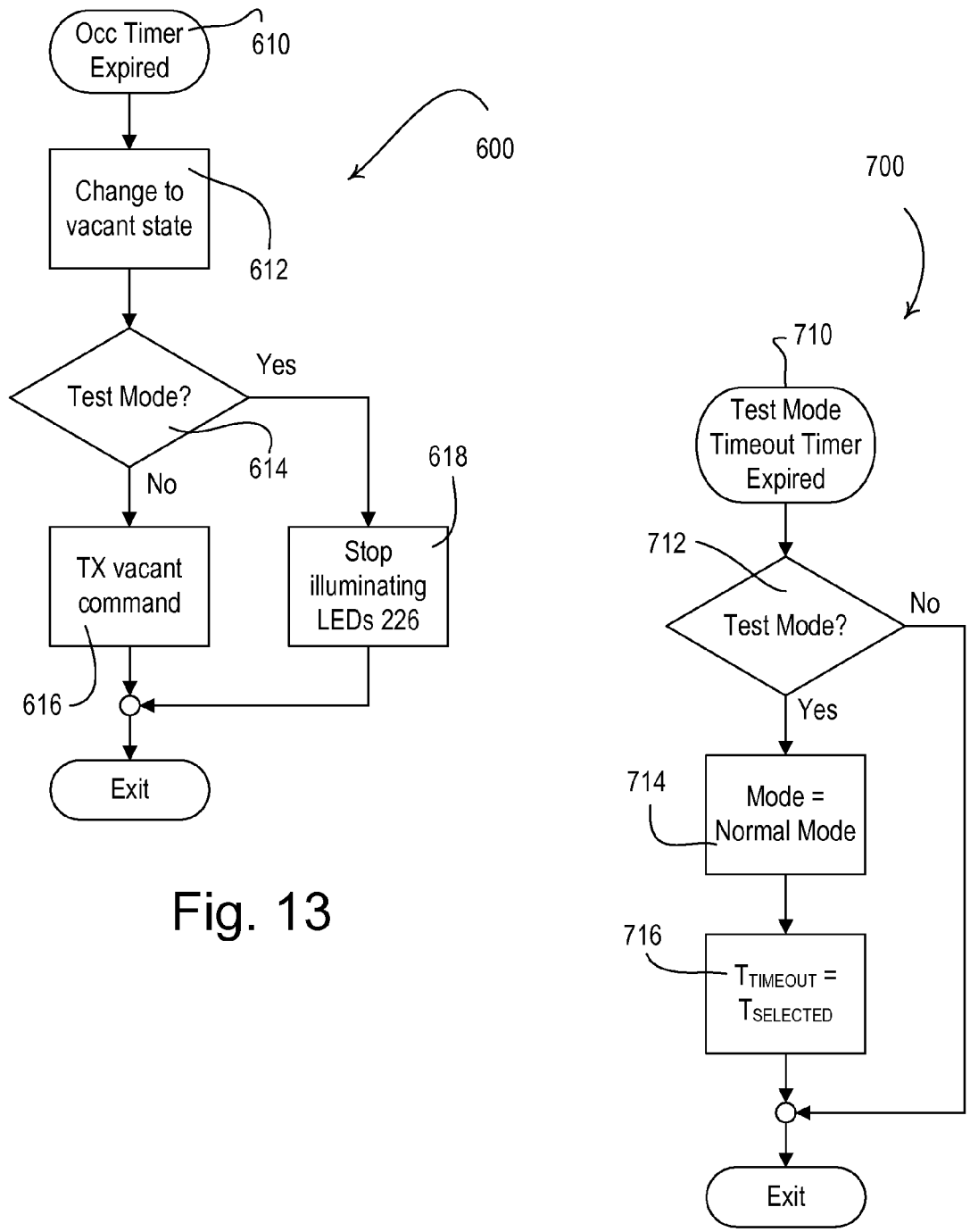
FIG. 13 is a flowchart of an occupancy timer procedure executed by the controller of the occupancy sensor of FIG. 2.
FIG. 14 is a flowchart of a test mode timeout timer procedure executed by the controller of the occupancy sensor of FIG. 2.

FIG. 13 is a flowchart of an occupancy timer procedure 600 executed by the controller 310 of each occupancy sensor 120 when the occupancy timer expires at step 610, i.e., when the occupancy sensor has determined that the space is unoccupied. First, the controller 310 changes to the vacant state at step 612. If the occupancy sensor 120 is not in the test mode (i.e., in the normal mode) at step 614, the controller 310 transmits the vacant command to the dimmer switch 110 at step 616 before the occupancy timer procedure 600 exits. If the occupancy sensor 120 is in the test mode at step 614, the controller 310 stops illuminating the LEDs 226 to stop illuminating the lens 124 at step 618 and the occupancy timer procedure 600 exits.

FIG. 14 is a flowchart of a test mode timeout timer procedure 700 executed by the controller 310 of each occupancy sensor 120 when the test mode timeout timer expires at step 710. If the occupancy sensor 120 is in the test mode at step 812, the controller 310 changes to the normal mode of operation at step 714 and sets the occupancy sensor timeout period $T_{TIMEOUT}$ to the selected timeout period value $T_{SELECTED}$ at step 716, before the test mode timeout timer procedure 700 exits.

Figure 15:
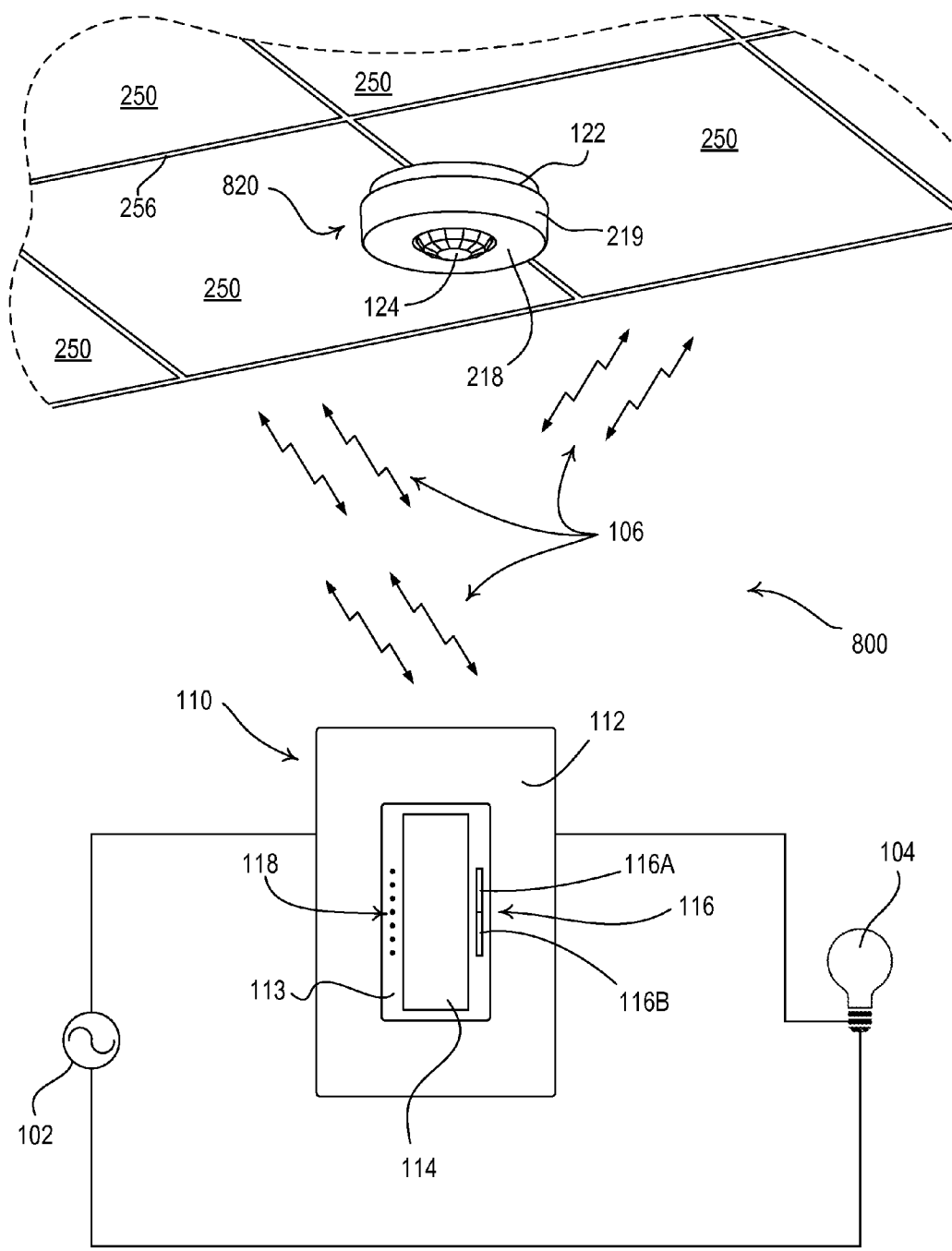
FIG. 15 is a diagram of an RF lighting control system having a remote occupancy sensor that is magnetically attached to a grid structure of a drop ceiling according to a second embodiment of the present invention.
Figure 16:
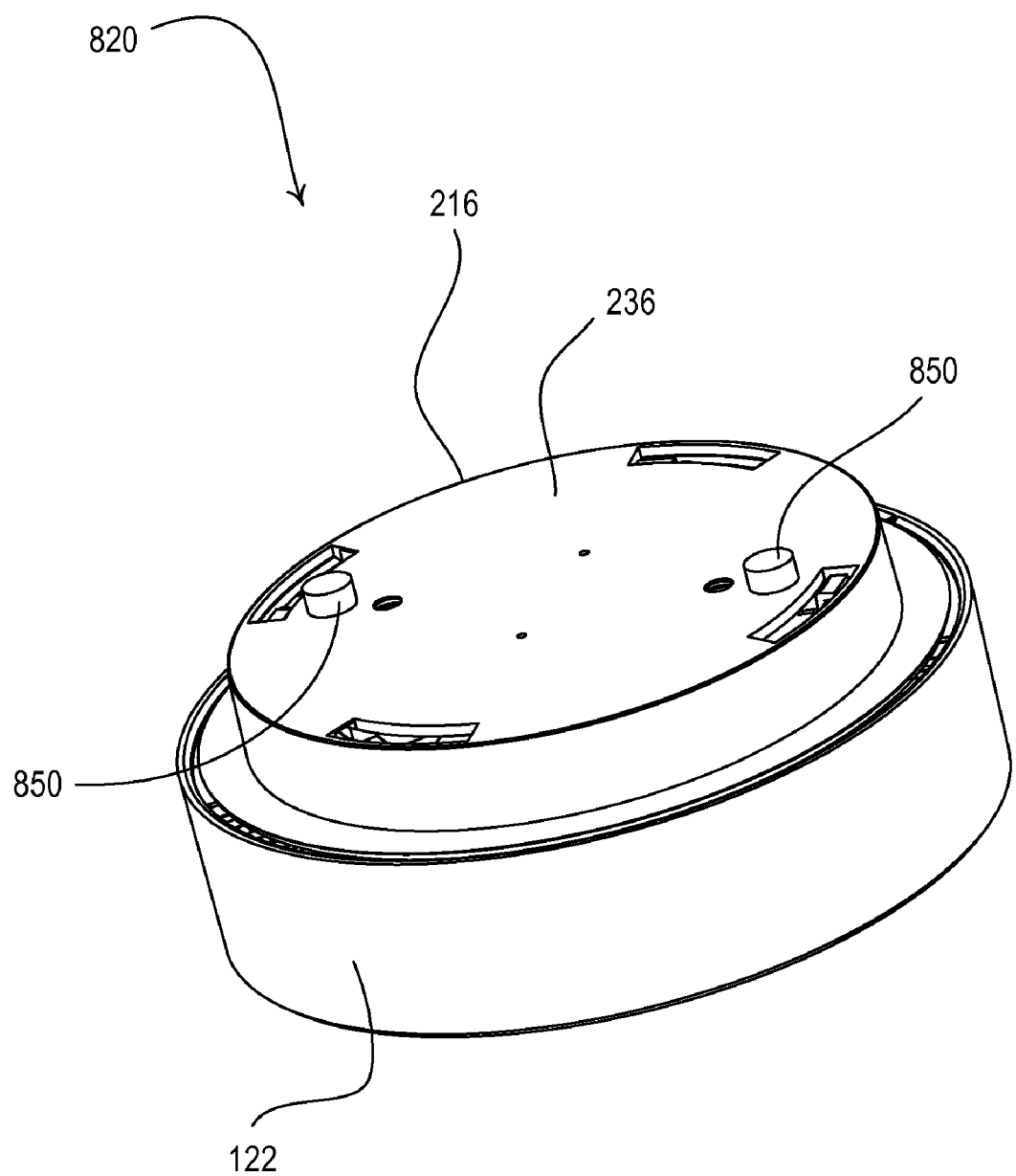
FIG. 16 is a rear perspective view of the occupancy sensor of FIG. 15.

FIG. 15 is a diagram of an RF lighting control system 800 having an occupancy sensor 820 according to a second embodiment of the present invention. The occupancy sensor 820 is releasably attached to the metal grid structure 256 that holds up the drop ceiling panels 250. FIG. 16 is a rear perspective view of the occupancy sensor 820. The occupancy sensor 820 comprises two magnets 850 attached (e.g., glued) to the rear surface 236 of the mounting plate 216, so that the occupancy sensor may be magnetically attached (and thus releasably attached) to the grid structure 256. The magnets 850 may comprise, for example, rare earth Neodymium-Iron-Boron magnets, each having a diameter of approximately 0.25 inch and a height of approximately 0.125 inch. The magnets 850 are arranged along a line that runs through the center of the circle formed by the rear surface 236 of the mounting plate 216, such that approximately one-half of the occupancy sensor 820 is located on each side of the grid structure 256 to which the occupancy sensor is attached. Alternatively, the magnets 850 could be positioned inside the occupancy sensor 820 (e.g., to the interior surface of the mounting plate 216) or could be molded as part of the mounting plate. Further, the occupancy sensor 820 could alternatively be coupled to another metal portion of a ceiling.

The occupancy sensor 820 of the second embodiment operates in a similar fashion as the occupancy sensor 120 of the first embodiment. While not shown in FIG. 15, the occupancy sensor 820 also comprises test buttons (i.e., the lights-on test button 220, the lights-off test button 222, and the sensor test button 224) that are accessible to a user (e.g., on the front surface 218 or on the sidewalls 215 of the enclosure 122) when the occupancy sensor is attached to the grid structure 256. Since the occupancy sensor 820 of the second embodiment is releasably mounted to the grid structure 256, the occupancy sensor may be configured and tested using the commissioning procedure 260 shown in FIG. 9. The magnets 850 also allow the occupancy sensor 820 to be permanently mounted to the metal grid structure 256.

The present invention provides a releasable mounting means for a ceiling-mounted control device, such as a wireless occupancy sensor, that allows the control device to be temporarily attached to a drop ceiling panel without removing the drop ceiling panel and without damaging the drop ceiling panel, and to be permanently affixed to the drop ceiling panel without the use of tools. The releasable mounting means comprises posts that are small and rigid enough to pierce the drop ceiling panel without creating large holes in the panel, and are ductile enough to be bent or twisted together by hand without the use of tools. In addition, the present invention provides a wireless sensor having buttons that are provided on an outwardly-facing surface of the device and allow a user to separately test the operation of the wireless communications and the sensor circuitry of the sensor.

The present invention has been described with reference to the lighting control system 100 having a plurality of occupancy sensors 120 (i.e., the dimmer switch 100 is operable to both turn on and turn off the lighting load 104 in response to the occupancy sensors). However, the concepts of the present invention can also be applied to a lighting control system having a plurality of vacancy sensors in which the dimmer switch 110 would not turn on, but would only turn off, the lighting load 104 in response to the vacancy sensors. In addition, the concepts of the present invention could be applied to any ceiling-mountable control device, such as, for example, a temperature sensor or a daylight sensor.

Further, even though the present invention has been described with reference to the dimmer switch 110 for controlling the intensity of the lighting load 104, the concepts of the present invention could be applied to load control systems comprising other types of load control devices, such as, for example, fan-speed controls for fan motors, electronic dimming ballasts for fluorescent loads, and drivers for light-emitting diodes (LEDs). Additionally, the concepts of the present invention could be used to control other types of electrical loads, such as, for example, fan motors or motorized window treatments.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A control device for a load control system, the control device adapted to be mounted to a ceiling panel, the ceiling panel having a substantially-flat front surface and an opposite rear surface, the control device comprising:
    a mounting plate comprising a rear surface adapted to be mounted adjacent to the front surface of the ceiling panel; and
    two posts, each post extending from the rear surface of the mounting plate in a direction substantially perpendicular to the rear surface of the mounting plate, each post has a small diameter and is rigid enough to pierce the ceiling panel without creating a large aesthetically-displeasing hole in the front surface of the ceiling panel;
    wherein the control device may be temporarily affixed to the ceiling panel by inserting the posts through the front surface and the rear surface of the ceiling panel, such that the posts extend from the rear surface of the ceiling panel, and the control device may be permanently affixed to the ceiling panel by bending the posts at the rear surface of the panel without the use of a tool, such that the ceiling panel is captured between the mounting plate and the deformed posts.

2. The control device of claim 1, wherein the two posts are formed from a single mounting structure and extend through openings in the mounting plate.

3. The control device of claim 2, wherein the mounting structure comprises a non-linear portion between the two posts, the non-linear portion provided in a plane substantially parallel to the rear surface of the mounting plate.

4. The control device of claim 3, wherein the non-linear portion prevents the posts from extending in a non-perpendicular direction from the rear surface of the mounting plate.

5. The control device of claim 3, wherein the non-linear portion comprises a z-shaped portion.

6. The control device of claim 1, wherein the posts are made of Type 302 stainless steel having a temper of ¼ hard.

7. The control device of claim 6, wherein the stainless steel has an elastic modulus of 193 GPa, and a yield strength of 517 MPa.

8. The control device of claim 1, wherein the posts are bent such that the posts are positioned substantially parallel to the rear surface of the ceiling panel.

9. The control device of claim 8, wherein the posts are bent to be flat against the rear surface of the ceiling panel.

10. The control device of claim 1, wherein the two posts are twisted together at the rear surface of the ceiling panel to permanently affix the control device to the ceiling panel.

11. The control device of claim 1, wherein each of the posts has a diameter of approximately 0.040 inch.

12. The control device of claim 1, wherein each of the posts has a length of approximately two inches.

13. The control device of claim 1, wherein the control device comprises a wireless occupancy sensor for detecting an occupancy condition in a space in which the wireless occupancy sensor is located.

14. The control device of claim 1, wherein the ceiling panel comprises a drop ceiling panel.

15. A method of attaching a control device to a ceiling panel having a substantially-flat front surface and a rear surface, the method comprising the steps of:
    providing two posts extending from a rear surface of the control device in a direction substantially perpendicular to the rear surface of the control device;
    piercing the front surface of the ceiling panel with the posts, such that the posts do not create large aesthetically-displeasing holes in the front surface of the ceiling panel;
    temporarily attaching the control device to the front surface of the ceiling panel by inserting the posts through the front surface and the rear surface of the ceiling panel, such that the posts extend from the rear surface of the ceiling panel; and
    permanently attaching the control device to the front surface of the ceiling panel by deforming the posts at the rear surface of the ceiling panel without the use of a tool, such that the ceiling panel is captured between the rear surface of the control device and the deformed posts.

16. The method of claim 15, wherein the step of permanently attaching the control device to the front surface of the ceiling panel comprises twisting the posts together at the rear surface of the ceiling panel.

17. The method of claim 15, wherein the step of permanently attaching the control device to the front surface of the ceiling panel comprises bending the posts such that the posts are positioned substantially parallel to the rear surface of the ceiling panel.

18. The method of claim 15, further comprising the step of:
    testing the operation of the control device prior to the step of permanently attaching the control device to the front surface of the ceiling panel.

19. The method of claim 15, further comprising the step of:
    temporarily attaching the control device to a first ceiling panel;
    testing the operation of the control device while the control device is temporarily attached to the first ceiling panel;
    detaching the control device from the first ceiling panel by removing the posts from the first ceiling panel;
    temporarily attaching the control device to a second ceiling panel;
    testing the operation of the control device while the control device is temporarily attached to the second ceiling panel; and
    permanently attaching the control device to the second ceiling panel.

20. The method of claim 15, further comprising the step of:
    temporarily attaching the control device to a first position on the front surface of the ceiling panel;
    testing the operation of the control device while the control device is temporarily attached to the first position on the front surface of the ceiling panel;
    detaching the control device from the first position on the ceiling panel by removing the posts from the ceiling panel;
    temporarily attaching the control device to a second position on the front surface of the ceiling panel;
    testing the operation of the control device while the control device is temporarily attached to the second position on the front surface of the ceiling panel; and
    permanently attaching the control device to the second position on the front surface of the ceiling panel.

21. An electronics assembly comprising:
    an electronics housing;

an adapter plate releasably coupled to said electronics housing; and a single bendable wire received by said adapter plate, said bendable wire adapted to be manually bent to hold its bent shape under the pressure created by the weight of said electronics housing, said bendable wire comprising a central base section disposed against an interior surface of said adapter plate and first and second parallel legs extending from opposite ends of said central base section and bent perpendicular to the plane of said interior surface of said adapter plate and extending through said adapter plate, said legs being shaped to be able to penetrate the thickness of a support panel without bending and being manually bendable behind said panel in order to bind said adapter plate flat against said panel.

22. The assembly of claim 21, wherein said electronics housing contains a wireless battery-powered occupancy sensor.

23. The assembly of claim 22, wherein said wire is electrically isolated from all electrical circuitry within said electronics housing.

24. The assembly of claim 21, wherein said wire has a circular cross-section.

25. The assembly of claim 24, wherein said wire has a diameter of about 0.40 inch.

26. The assembly of claim 21, wherein said wire is stainless steel.

27. The assembly of claim 21, wherein said base of said wire is bent to a Z-shape which lies in a plane parallel to the plane of said interior surface of said adapter plate.

28. The assembly of claim 21, wherein the ends of said legs are bent toward one another and are twisted together.

29. A process of affixing an electronic device to a ceiling panel, said process comprising the steps of:
inserting parallel, spaced legs of a single wire through openings in a flat adapter plate until a base portion of said wire is pressed flat against one surface of said adapter plate;
forcing said spaced legs of said wire through respective spaced points on a first surface of said ceiling panel;
manually bending said legs against a second surface opposite said first surface of said ceiling panel to press and hold said adapter plate against said first surface of said ceiling panel; and
removably connecting said electronic device to said adapter plate.

30. The process of claim 29, wherein said spaced legs are twisted together to fix said adapter plate against said first surface of said ceiling panel.

31. The process of claim 30, wherein said electronic device is a battery-operated occupancy sensor, which is repositionable on said ceiling panel by removing said wire legs from said panel and repenetrating said panel with said legs at a different location until a desirable result is obtained for said occupancy sensor.

32. A mounting structure for mounting an electrical device to a penetrable thin flat support sheet structure having a front and a rear surface, said electrical device comprising a main housing containing electrical circuitry and a planar mounting plate removably connectable to said main housing, said mounting structure comprising:
a pliant member having a central base portion and first and second parallel legs extending from opposite ends of said central base portion, said central base portion being positioned adjacent to and against a rear surface of said mounting plate with said legs extending through said mounting plate and away from said main housing, said first and second legs having ends that are shaped to enable non-destructive penetration of said flat support sheet at spaced locations without distortion of said legs, said legs being manually deformable behind said rear surface of said thin flat sheet structure after penetration of said thin flat sheet structure to attach said mounting plate to said front surface of said thin flat sheet structure.

33. The mounting structure of claim 32, wherein said pliant member is a thin steel wire.

34. The mounting structure of claim 33, wherein said central base of said pliant member has a Z-shape lying in the plane of said rear surface of said mounting plate.

35. The mounting structure of claim 32, wherein said legs are secured together after penetration of said thin flat sheet structure by twisting behind said rear surface of said thin flat sheet structure.

36. The mounting structure of claim 35, wherein said thin flat sheet structure is a ceiling tile panel.

37. The mounting structure of claim 35, wherein said electrical circuitry is a battery operated occupancy sensor and wherein said pliant member is electrically isolated from said electrical circuitry.

38. An occupancy sensor for detecting the presence or absence of an occupant in a space, the occupancy sensor adapted to be mounted to a surface, the occupancy sensor for use in a lighting control system for control of the amount of power delivered to an electrical load in response to detecting the presence or absence of the occupant in the space, the occupancy sensor comprising:
an occupancy detector circuit for detecting the presence or absence of the occupant in the space;
a controller responsive to the occupancy detector circuit and operable to change to an occupied state in response to the occupancy detector circuit detecting the presence of the occupant in the space, the controller further operable to change to a vacant state at the end of a timeout period after the occupancy detector circuit detecting the absence of the occupant in the space, the timeout period having a first value in a normal mode of operation of the sensor;
a wireless transmitter coupled to the controller for transmitting digital messages when the controller changes between the occupied and vacant states;
a first communication test button accessible by the occupant when the occupancy sensor is mounted to the surface, the controller operable to transmit a first digital message in response to an actuation of the first communication test button; and
a sensor test button accessible by the occupant when the occupancy sensor is mounted to the surface, the controller operable to operate in a test mode in response to an actuation of the sensor test button;
wherein when the controller is operating in the test mode, the timeout period has a second value less than the first value used in the normal mode of operation of the sensor.

39. The sensor of claim 38, further comprising:
an enclosure having an outwardly-facing surface and sidewalls, the enclosure housing the occupancy detector circuit, the controller, and the wireless transmitter.

40. The sensor of claim 39, further comprising:
a visual indicator coupled to the controller, such that the controller is operable to controllably illuminate the visual indicator;
wherein the controller illuminates the visual indicator in response to detecting the presence of the occupant in the space and stops illuminating the visual indicator in response to detecting the absence of the occupant in the space when the controller is operating in the test mode.

41. The sensor of claim 40, wherein the detector circuit comprises an infrared detector responsive to infrared energy representative of the occupied state or the vacant state in the space, the sensor further comprising a lens positioned to direct the infrared energy from the space to the infrared detector.

42. The sensor of claim 41, further comprising:
a light-emitting diode positioned to illuminate the lens, the light-emitting diode coupled to the controller, such that the controller is operable to controllably illuminate the light-emitting diode;
wherein the lens and the light-emitting diode define the visual indicator, the controller operable to illuminate the light-emitting diode to illuminate the lens in response to detecting the presence of the occupant in the space when the controller is operating in the test mode.

43. The sensor of claim 39, further comprising:
a mounting plate comprising a rear surface adapted to be mounted adjacent to the surface, the mounting plate positioned at an end of the enclosure opposite the outwardly-facing surface.

44. The sensor of claim 43, wherein the surface comprises a drop ceiling panel having a substantially-flat front surface and an opposite rear surface and the occupancy sensor further comprises:
two posts, each post extending from the rear surface of the mounting plate in a direction substantially perpendicular to the rear surface of the mounting plate, the two posts each having a small diameter and being rigid enough to pierce the ceiling panel without creating a large aesthetically-displeasing hole in the front surface of the ceiling panel;
wherein the occupancy sensor may be temporarily affixed to the ceiling panel by inserting the posts through the front surface and the rear surface of the ceiling panel, such that the posts extend from the rear surface of the ceiling panel, and the occupancy sensor may be permanently affixed to the ceiling panel by bending the posts at the rear surface of the ceiling panel without the use of a tool, such that the ceiling panel is captured between the mounting plate and the deformed posts.

45. The sensor of claim 43, wherein the surface comprises a grid structure for supporting a drop ceiling panel and the occupancy sensor further comprises:
a magnet attached to the mounting plate, such that the occupancy sensor may be magnetically attached to the grid structure.

46. The sensor of claim 39, wherein the first communication button and the sensor test button are provided on the outwardly-facing surface of the enclosure.

47. The sensor of claim 39, wherein the first communication button and the sensor test button are provided on the sidewalls of the enclosure.

48. The sensor of claim 38, further comprising:
a second communication test button accessible by the occupant when the occupancy sensor is mounted to the surface, the controller operable to transmit a second digital message in response to an actuation of the second communication test button;
wherein the first digital message comprises a lights-on digital message and the second digital message comprises a lights-off digital message.

49. A method of commissioning a load control system comprising a load control device for control of the amount of power delivered from an AC power source to an electrical load and an occupancy sensor for detecting the presence or absence of an occupant in a space, the method comprising the steps of:
releasably mounting the occupancy sensor to a first position on a surface, the occupancy sensor operable to detect the presence or absence of the occupant in the space, such that the occupancy sensor changes to an occupied state in response to detecting the presence of the occupant in the space, and to a vacant state at the end of a timeout period after detecting the absence of the occupant in the space, the timeout period having a first value in a normal mode of operation of the sensor;
actuating a first communication test button on the occupancy sensor without detaching the occupancy sensor from the surface;
transmitting a first digital message from the occupancy sensor to the load control device in response to the step of actuating a first communication test button;
adjusting the amount of power delivered to the electrical load in response to the load control device receiving the first digital message;
actuating a sensor test button on the occupancy sensor without detaching the occupancy sensor from the surface;
operating the occupancy sensor in a test mode in response to the step of actuating a sensor test button, the timeout period having a second value in the test mode, where the second value is less than the first value used in the normal mode of operation of the sensor;
determining if the operation of the occupancy sensor at the first position on the surface is acceptable in response to the steps of the load control device adjusting the amount of power delivered to the electrical load and the occupancy sensor operating in a test mode;
removing the occupancy sensor from the first position if the operation of the occupancy sensor at the first position is not acceptable; and
permanently mounting the occupancy sensor to the first position if the operation of the occupancy sensor at the first position is acceptable.

50. The method of claim 49, wherein the step of the load control device adjusting the amount of power delivered to the electrical load in response to receiving the first digital message further comprises the load control device turning on the electrical load in response to receiving the first digital message.

51. The method of claim 50, further comprising the steps of:
actuating a second communication test button on the occupancy sensor without detaching the occupancy sensor from the surface;
the occupancy sensor transmitting a second digital message to the load control device in response to the step of actuating a second communication test button; and
the load control device turning off the electrical load in response to receiving the second digital message.

52. The method of claim 49, further comprising the step of:
detecting the presence of the occupant in the space when the occupancy sensor is operating in the test mode; and
illuminating a visual indicator in response to the step of detecting the presence of the occupant in the space.

53. The method of claim 52, further comprising the step of:
detecting the absence of the occupant in the space when the occupancy sensor is operating in the test mode; and
stopping illuminating the visual indicator in response to the step of detecting the absence of the occupant in the space.

54. The method of claim 52, wherein the step of illuminating the visual indicator comprises illuminating a lens of the occupancy sensor in response to the step of detecting the presence of the occupant in the space.

55. The method of claim 49, wherein the surface comprises a drop ceiling panel having a substantially-flat front surface and an opposite rear surface, and the occupancy sensor further comprises two posts extending from a rear surface of the occupancy sensor in a direction substantially perpendicular to the rear surface of the occupancy sensor;

wherein the step of releasably mounting the occupancy sensor to a first position on a surface comprises piercing the front surface of the ceiling panel with the posts, such that the posts do not create large aesthetically-displeasing holes in the front surface of the ceiling panel, and inserting the posts through the front surface and the rear surface of the ceiling panel, such that the posts extend from the rear surface of the ceiling panel; and wherein the step of permanently mounting the occupancy sensor to the first position if the operation of the occupancy sensor at the first position is acceptable comprises deforming the posts at the rear surface of the ceiling panel without the use of a tool, such that the ceiling panel is captured between the rear surface of the sensor and the deformed posts.

56. The method of claim 49, wherein the surface comprises a grid structure for supporting a drop ceiling panel and the occupancy sensor further comprises a magnet, such that the occupancy sensor may be magnetically attached to the grid structure.

* * * * *